(12) United States Patent
Oshitani et al.

(10) Patent No.: US 7,757,514 B2
(45) Date of Patent: Jul. 20, 2010

(54) EJECTOR-TYPE REFRIGERANT CYCLE DEVICE

(75) Inventors: Hiroshi Oshitani, Toyota (JP); Hirotsugu Takeuchi, Nagoya (JP); Etsuhisa Yamada, Kariya (JP); Haruyuki Nishijima, Obu (JP)

(73) Assignee: Denso Corporation, Kariya (JP)

( * ) Notice: Subject to any disclaimer, the term of this patent is extended or adjusted under 35 U.S.C. 154(b) by 1066 days.

(21) Appl. No.: 10/581,088

(22) PCT Filed: Sep. 22, 2005

(86) PCT No.: PCT/JP2005/017447

§ 371 (c)(1), (2), (4) Date: May 31, 2006

(87) PCT Pub. No.: WO2006/033378

PCT Pub. Date: Mar. 30, 2006

(65) Prior Publication Data

US 2007/0119207 A1 May 31, 2007

(30) Foreign Application Priority Data

Sep. 22, 2004 (JP) ............................. 2004-275152
Aug. 3, 2005 (JP) ............................. 2005-225189

(51) Int. Cl.
*F25B 1/06* (2006.01)
*F25B 39/04* (2006.01)

(52) U.S. Cl. ..................... 62/500; 62/191; 62/196.1; 62/197; 62/198; 62/199; 62/278; 62/509

(58) Field of Classification Search .................. 62/191, 62/196.1, 197, 198, 199, 278, 500, 509
See application file for complete search history.

(56) References Cited

U.S. PATENT DOCUMENTS 6,477,857 B2 11/2002 Takeuchi et al.

(Continued)

FOREIGN PATENT DOCUMENTS

DE 10343820 A1 4/2004

(Continued)

OTHER PUBLICATIONS

Office Action dated Jun. 5, 2009 in Chinese Application No. 2005 80002268.8.

(Continued)

*Primary Examiner*—Frantz F. Jules
*Assistant Examiner*—Daniel C Comings
(74) *Attorney, Agent, or Firm*—Harness, Dickey & Pierce, PLC

(57) ABSTRACT

An ejector-type refrigerant cycle device includes: a first evaporator 15 that evaporates refrigerant flowing out of an ejector 14; a branch passage 17 that branches a flow of refrigerant between a radiator 13 and the ejector 14 and guides this flow of refrigerant to a vapor-phase refrigerant suction port 14c of the ejector 14; a throttling mechanism 18 disposed in the branch passage 17; and a second evaporator 19 disposed downstream of the throttling mechanism 18 with respect to the flow of refrigerant. The throttling mechanism 18 is constructed to be provided with a fully opening function, and to fully open the branch passage 17 when the second evaporator 19 is defrosted. Therefore, in an ejector-type refrigerant cycle device including multiple evaporators, the function of defrosting the evaporators can be carried out with a simple construction.

34 Claims, 29 Drawing Sheets

U.S. PATENT DOCUMENTS

| | | | |
|---|---|---|---|
| 6,574,987 | B2 | 6/2003 | Takeuchi et al. |
| 6,584,794 | B2 | 7/2003 | Takeuchi et al. |
| 6,651,451 | B2 * | 11/2003 | Cho et al. ............... 62/197 |
| 6,675,609 | B2 * | 1/2004 | Takeuchi et al. ......... 62/500 |
| 2003/0167793 | A1 * | 9/2003 | Honda et al. ............. 62/500 |
| 2004/0079102 | A1 * | 4/2004 | Umebayashi et al. ..... 62/324.1 |
| 2005/0178150 | A1 * | 8/2005 | Oshitani et al. .......... 62/500 |

FOREIGN PATENT DOCUMENTS

| | | |
|---|---|---|
| JP | 03-005674 | 1/1991 |
| JP | 05-312421 | 11/1993 |
| JP | 2002-318019 A | 10/2002 |
| JP | 2003-83622 A | 3/2003 |
| JP | 2003-097868 | 4/2003 |
| JP | 2004-163084 A | 6/2004 |
| JP | 3102651 U | 7/2004 |
| JP | 2004-239493 A | 8/2004 |
| JP | 2005-308380 A | 11/2005 |

OTHER PUBLICATIONS

Office Action dated Jul. 10, 2009 in corresponding Chinese Application No. 2008 10095676.8.

Office Action dated Oct. 26, 2007 in Chinese Application No. 2005 80002268.8 with English translation.

Office Action dated Aug. 14, 2009 in corresponding Chinese Application No. 2008 10095677.2.

* cited by examiner

FIG. 1
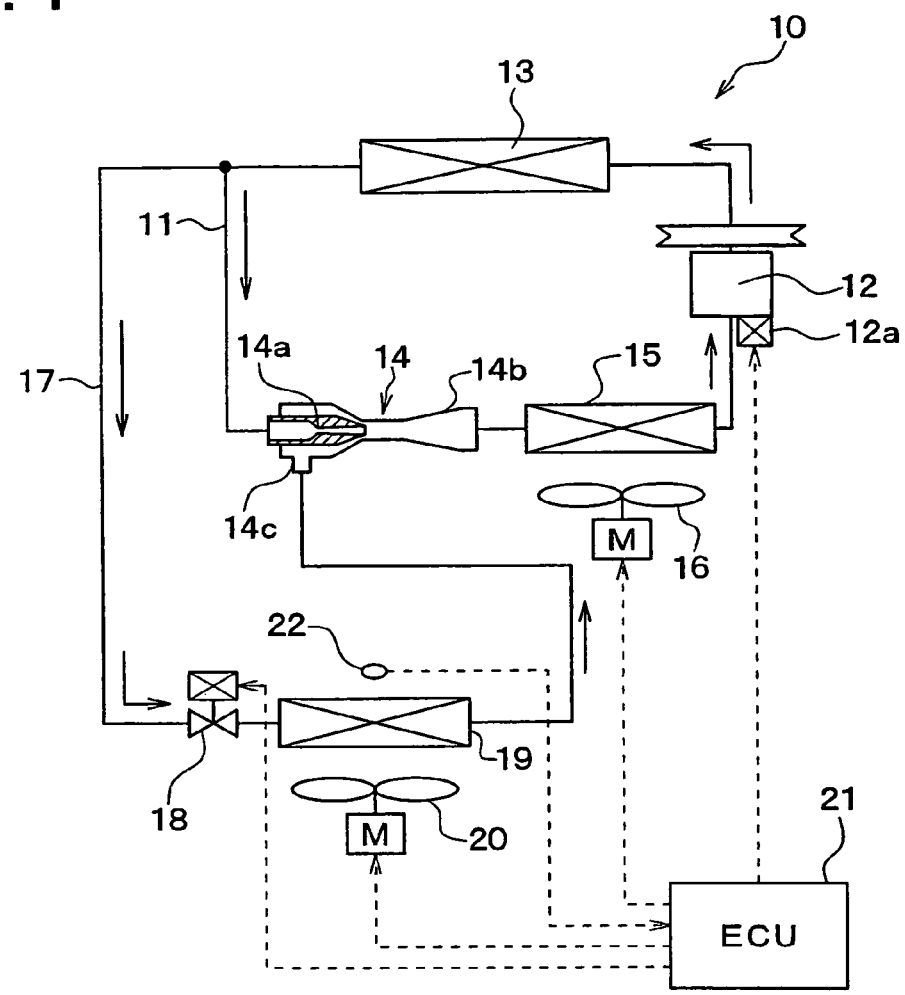
FIG. 2
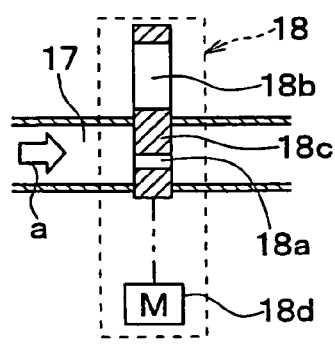
(a) NORMAL (FIXED THROTTLE)
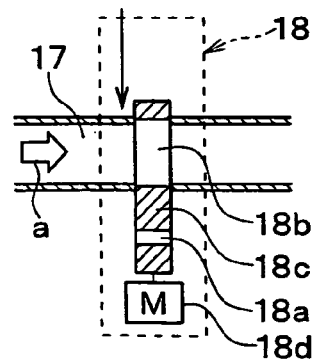
(b) DEFROSTING (FULLY OPENING)

|  | NORMAL OPERATION | DEFROSTING OPERATION |
|---|---|---|
| COMPRESSOR 12 | ON | OFF |
| COOLING FAN 13a FOR RADIATOR | ON | OFF OR ON |
| BLOWER 16 FOR EVAPORATOR | ON | OFF |
| THROTTLE MECHANISM 18 | PREDETERMINED THROTTLING OPEN | FULLY OPEN |

|  | NORMAL OPERATION | DEFROSTING OPERATION |
|---|---|---|
| COMPRESSOR 12 | ON | ON |
| COOLING FAN 13a FOR RADIATOR | ON | OFF |
| BLOWER 16 FOR EVAPORATOR | ON | OFF |
| THROTTLE MECHANISM 18 | PREDETERMINED THROTTLING OPEN | FULLY OPEN |
| THROTTLE MECHANISM 38 | FULLY OPEN | PREDETERMINED THROTTLING OPEN |
| SHUT MECHANISM 31 | FULLY OPEN | FULLY CLOSE |

|  | NORMAL OPERATION | DEFROSTING AND COOLING OPERATION |
|---|---|---|
| COMPRESSOR 12 | ON | ON |
| COOLING FAN 13a FOR RADIATOR | ON | ON |
| BLOWER 16 FOR FIRST EVAPORATOR | ON | ON |
| BLOWER 20 FOR SECOND EVAPORATOR | ON | OFF |
| THROTTLE MECHANISM 18 | PREDETERMINED THROTTLING OPEN | FULLY OPEN |
| THROTTLE MECHANISM 39 | FULLY OPEN | PREDETERMINED THROTTLING OPEN |

|  | NORMAL OPERATION | DEFROSTING OPERATION |
|---|---|---|
| COMPRESSOR 12 | ON | ON |
| COOLING FAN 13a FOR RADIATOR | ON | OFF |
| THROTTLE MECHANISM 181 | SMALL THROTTLE OPEN | LARGE THROTTLE OPEN |
| BLOWER 16 FOR EVAPORATOR | ON | OFF |
| SHUT MECHANISM 31 | FULLY OPEN | FULLY CLOSE |

FIG. 29

|  | NORMAL OPERATION | DEFROSTING OPERATION |
|---|---|---|
| COMPRESSOR 12 | ON | ON |
| COOLING FAN 13a FOR RADIATOR | ON | ON |
| THROTTLE MECHANISM 181 | SMALL THROTTLE OPEN | LARGE THROTTLE OPEN |
| BLOWER 16 FOR EVAPORATOR | ON | OFF |
| SHUT MECHANISM 31 | FULLY OPEN | FULLY CLOSE |
| SHUT MECHANISM 41 | FULLY CLOSE | FULLY OPEN |
| SHUT MECHANISM 42 | FULLY OPEN | FULLY CLOSE |

FIG. 32

|  | NORMAL OPERATION | DEFROSTING OPERATION |
|---|---|---|
| COMPRESSOR 12 | ON | ON |
| COOLING FAN 13a FOR RADIATOR | ON | OFF |
| THROTTLE MECHANISM 181 | SMALL THROTTLE OPEN | LARGE THROTTLE OPEN |
| BLOWER 16 FOR EVAPORATOR | ON | OFF |
| SHUT MECHANISM 31 | FULLY OPEN | FULLY CLOSE |
| THROTTLE MECHANISM 182 | SMALL THROTTLE OPEN | LARGE THROTTLE OPEN |

EJECTOR-TYPE REFRIGERANT CYCLE DEVICE

CROSS REFERENCE TO RELATED APPLICATIONS

This application is a U.S. National Stage Application of International application No. PCT/JP2005/017447, filed Sep. 22, 2005. This application claims the benefit of Application JP 2004-275152, filed Sep. 22, 2004, and Application JP 2005-225189, filed Aug. 3, 2005. The disclosure(s) of the above applications are incorporated herein by reference.

TECHNICAL FIELD

The present invention relates to a defrosting operation of an ejector-type refrigerant cycle device having an ejector that functions as a refrigerant pressure reducing means and a refrigerant circulating means. The present invention is effectively applicable to, for example, a refrigerant cycle for an air conditioner and a refrigerator of a vehicle.

BACKGROUND ART

A defrosting operation of an ejector-type refrigerant cycle device has been already proposed in Patent Document 1. In the cycle configuration disclosed in this patent document, a vapor-liquid separator is disposed downstream of an ejector and an evaporator is provided between a liquid phase refrigerant outlet of the vapor-liquid separator and a refrigerant suction port of the ejector. The cycle configuration is provided with a bypass passage that connects a channel on a discharge side of a compressor directly to a channel upstream of the evaporator, and this bypass passage is provided with a shut mechanism.

A mechanism (e.g., throttle, check valve) is provided between the joint between the channel on the upstream side of the evaporator and the bypass passage, and the liquid phase refrigerant outlet of the vapor-liquid separator. The mechanism is for preventing high-temperature refrigerant from the bypass passage from going toward the liquid phase refrigerant outlet of the vapor-liquid separator.

When the evaporator is defrosted, the shut mechanism in the bypass passage is brought into an open state, and high-temperature refrigerant (hot gas) on the discharge side of the compressor is led from the bypass passage into the evaporator. The evaporator is thereby defrosted. At this time, the above-described mechanism makes it possible to prevent high-temperature refrigerant from going toward the liquid phase refrigerant outlet of the vapor-liquid separator. Therefore, all of the high-temperature refrigerant from the bypass passage can be used to defrost the evaporator. (Refer to JP 2003-83622A, for example.)

In the cycle configuration disclosed in JP 2003-83622A, an evaporator is provided only between the liquid phase refrigerant outlet of a vapor-liquid separator and the refrigerant suction port of an ejector. It does not propose anything about a defrosting means in an ejector-type refrigerant cycle device having multiple evaporators.

DISCLOSURE OF THE INVENTION

An object of the present invention is to provide a defrosting means for an ejector-type refrigerant cycle device having multiple evaporators.

To achieve the above object, according to a first example of the present invention, an ejector-type refrigerant cycle device includes: a compressor (12) that sucks and compresses refrigerant; a radiator (13) that radiates heat from the high-pressure refrigerant discharged from the compressor (12); an ejector (14) having a nozzle portion (14a) that depressurizes and expands refrigerant on a downstream side of the radiator (13), and a refrigerant suction port (14c) through which refrigerant is sucked by the flow of refrigerant jetted at high speed from the nozzle portion (14a); a first evaporator (15) having a refrigerant outflow side connected to a suction side of the compressor (12); a first branch passage (17) that branches a flow of refrigerant upstream of the ejector (14) and guides the branched flow of refrigerant to the refrigerant suction port (14c); a first throttling means (18) that is disposed in the first branch passage (17) and depressurizes and expands refrigerant; and a second evaporator (19) that is disposed in the first branch passage (17) downstream of the first throttling means (18). In the refrigerant cycle device, a refrigerant evaporating pressure of the second evaporator (19) is lower than a refrigerant evaporating pressure of the first evaporator (15), and the first throttling means (18) is provided with a fully opening function and fully opens the first branch passage (17) when the second evaporator (19) is defrosted.

Thus, it is possible to obtain cooling capability in a high temperature range with the first evaporator (15) that is high in refrigerant evaporating pressure and further obtain cooling capability in a low temperature range with the second evaporator (19) that is low in the refrigerant evaporating pressure.

When the second evaporator (19) is defrosted, the first throttling means (18) is operated to the position in which the first branch passage (17) is fully opened. Thus, the high-temperature, high-pressure refrigerant at the outlet of the radiator (13) can be directly introduced into the second evaporator (19) through the first branch passage (17).

Thus, the second evaporator (19) can be effectively defrosted. The first throttling means (18) functions to reduce the pressure of refrigerant in the normal operation. In a defrosting operation, the second evaporator (19) can be defrosted with a very simple construction without adding any special part just by bringing this first throttling means into a fully open state.

The refrigerant on the downstream side of the radiator (13) is let into the second evaporator (19) through the throttling means (18). In the normal operation, therefore, the flow rate of refrigerant in the second evaporator (19) can be easily adjusted to a value corresponding to a thermal load by the throttling means (18).

"The fully opening function of fully opening the first branch passage (17)" includes a function of opening the first branch passage (17) while slightly reducing its area, in addition to a function of fully opening it. That is, there are cases where the first throttling means (18) is inevitably so constructed that the first branch passage (17) is opened with its area slightly reduced for manufacture reasons or the like.

According to a second example of the present invention, an ejector-type refrigerant cycle device includes: a compressor (12) that sucks and compresses refrigerant; a radiator (13) that radiates heat from high-pressure refrigerant discharged from the compressor (12); an ejector (14) having a nozzle portion (14a) that depressurizes and expands refrigerant on a downstream side of the radiator (13), and a refrigerant suction port (14c) through which refrigerant is sucked by the flow of refrigerant jetted at high speed from the nozzle portion (14a); a first evaporator (15) having a refrigerant outflow side connected to a suction side of the compressor (12); a first branch passage (17) that branches a flow of refrigerant upstream of the ejector (14) and guides the branched flow of refrigerant to the refrigerant suction port (14c); a first throttling means (180) that is disposed in the first branch passage (17) and depressurizes and expands refrigerant; a second evaporator (19) that is disposed in the first branch passage (17) downstream of the first throttling means (180); a bypass passage (23) that guides the high-pressure refrigerant discharged from the compressor (12) directly into the second evaporator (19); and a shut mechanism (24) that is provided in the bypass passage (23). In the refrigerant cycle device, a refrigerant evaporating pressure of the second evaporator (19) is lower than a refrigerant evaporating pressure of the first evaporator (15), and the shut mechanism (24) is constructed to be normally closed, and to open the bypass passage (23) when the second evaporator (19) is defrosted.

The second example of the present invention is constructed by modifying the defrosting means for the second evaporator (19) in the first example. That is, in the second example of the present invention, when the second evaporator (19) is defrosted, the high-temperature, high-pressure refrigerant on the discharge side of the compressor (12) is directly led into the second evaporator (19) through the bypass passage (23). The second evaporator (19) can be thereby defrosted.

In addition, the first throttling means (180) need not be provided with a fully opening function. Therefore, an ordinary fixed throttle or variable throttle can be directly used as the first throttling means (180) without change. The other operation and effects of the second example of the present invention are the same as those of the first example.

According to a third example of the present invention, an ejector-type refrigerant cycle device includes: a compressor (12) that sucks and compresses refrigerant; a radiator (13) that radiates heat from the high-pressure refrigerant discharged from the compressor (12); an ejector (14) having a nozzle portion (14a) that depressurizes and expands refrigerant on the downstream side of the radiator (13) and a refrigerant suction port (14c) through which refrigerant is sucked by the flow of refrigerant jetted at high speed from the nozzle portion (14a); a first evaporator (15) having a refrigerant outflow side connected to a suction side of the compressor (12); a first branch passage (17) that branches a flow of refrigerant upstream of the ejector (14) and guides the branched flow of refrigerant to the refrigerant suction port (14c); a first throttling means (180) that is disposed in the first branch passage (17) and depressurizes and expands refrigerant; a second evaporator (19) that is disposed in the first branch passage (17) downstream of the first throttling means (180); a bypass passage (33) that bypasses the first throttling means (180); and a shut mechanism (34) that is provided in the bypass passage (33), In the refrigerant cycle device, a refrigerant evaporating pressure of the second evaporator (19) is lower than a refrigerant evaporating pressure of the first evaporator (15), and the shut mechanism (34) is constructed to be normally closed, and to open the bypass passage (33) when the second evaporator (19) is defrosted.

That is, in the third example of the present invention, when the second evaporator (19) is defrosted, the bypass passage (33) of the first throttling means (180) is opened by the shut mechanism (34). Thus, the high-temperature, high-pressure refrigerant at the outlet of the radiator (13) can be directly led into the second evaporator (19) through the bypass passage (33).

Thus, the second evaporator (19) can be effectively defrosted. In addition, the first throttling means (180) need not be provided with a fully opening function. Therefore, an ordinary fixed throttle or variable throttle can be used as the first throttling means (180) without change.

The above-described ejector-type refrigerant cycle device may be provided with a third evaporator (27). The third evaporator (27) has a cooling capability by evaporating refrigerant in the same temperature zone as that of the above-described first evaporator (15).

Thus, cooling performance can be delivered in the same temperature zone using the multiple evaporators (15, 27).

Further, a second branch passage (25) and a second throttling means (26) may be provided. The second branch passage (25) branches the flow of refrigerant at a point of the first branch passage (17) positioned upstream of the first throttling means (18, 180), and joins the branched flow of refrigerant to the flow of refrigerant between the refrigerant outflow side of the first evaporator (15) and the suction side of the compressor (12).

The second throttling means (26) is disposed in the second branch passage (25) and reduces the pressure of refrigerant.

The third evaporator (27) may be disposed downstream of the second throttling means (26) in the second branch passage (25).

Specifically, as mentioned above, the second branch passage (25) is formed, and the third evaporator (27) can be disposed in the second branch passage (25).

In the above-described ejector-type refrigerant cycle device, the first evaporator (15) may be connected to the refrigerant outflow side of the ejector (14).

A third throttling means (30) can be provided between the refrigerant outflow side of the radiator (13) and the refrigerant inflow side of the first evaporator (15). The ejector (14) can be provided in parallel with the third throttling means (30).

Thus, it is unnecessary to bring the ejector (14) in charge of refrigerant flow rate adjusting a function for the first evaporator (15) because the third throttling means (30) dedicated to the first evaporator (15) is provided. For this reason, the ejector (14) can be specialized in a pump function for producing a pressure difference between the first and second evaporators (15, 19).

Thus, the shape of the ejector (14) can be optimally designed so as to produce a predetermined pressure difference between the first and second evaporators (15, 19). As a result, the ejector-type refrigerant cycle device can be operated with high efficiency even if cycle operating conditions (number of compressor revolutions, ambient temperature, temperature of space to be cooled, etc.) fluctuate over a wide range.

In a case where there is provided with a shut mechanism (31) that shuts the upstream portion of the ejector (14) when the second evaporator (19) is defrosted, if the second evaporator (19) is defrosted, the flow of high-pressure refrigerant flowing from the refrigerant outflow side of the radiator (13) into the ejector (14) can be interrupted. Thus, the quantity of the high-pressure refrigerant flowing into the second evaporator (19) can be increased to enhance defrosting performance.

The ejector-type refrigerant cycle device in the second example may be provided with a shut mechanism (32) that shuts the upstream portion of the radiator (13) when the second evaporator (19) is defrosted. Thus, when the second evaporator (19) is defrosted, the quantity of high-pressure refrigerant flowing from the discharge side of the compressor (12) into the second evaporator (19) can be increased to enhance defrosting performance.

According to a fourth example of the present invention, an ejector-type refrigerant cycle device includes: a compressor (12) that sucks and compresses refrigerant; a radiator (13) that radiates heat from a high-pressure refrigerant discharged from the compressor (12); an ejector (14) having a nozzle portion (14a) that depressurizes and expands refrigerant on a downstream side of the radiator (13), and a refrigerant suction port (14*c*) through which refrigerant is sucked by the flow of refrigerant jetted at high speed from the nozzle portion (14*a*); a first evaporator (15) that evaporates the refrigerant flowing out of the ejector (14); a vapor-liquid separator (35) that separates the refrigerant flowing out of the first evaporator (15) into vapor and liquid, and stores liquid phase refrigerant and lets vapor phase refrigerant out to a suction side of the compressor (12); a branch passage (36) that connects a liquid phase refrigerant outlet of the vapor-liquid separator (35) to the refrigerant suction port (14*c*); a throttling means (180) that is disposed in the branch passage (36), and depressurizes and expands the liquid phase refrigerant flowing out of the vapor-liquid separator (35); a second evaporator (19) that is disposed in the branch passage (36) downstream of the throttling means (180); a bypass passage (23) that guides the high-pressure refrigerant discharged from the compressor (12) directly into the second evaporator (19); and a shut mechanism (24) that is provided in the bypass passage (23). In the refrigerant cycle device, a refrigerant evaporating pressure of the second evaporator (19) is lower than a refrigerant evaporating pressure of the first evaporator (15), and the shut mechanism (24) is constructed to be normally closed, and to open the bypass passage (23) when the second evaporator (19) is defrosted.

In this case, the branch passage (36) that connects the liquid phase refrigerant outlet portion of the vapor-liquid separator (35) to the refrigerant suction port (14*c*) may be provided, and this branch passage (36) may be provided with the throttling means (180) and the second evaporator (19).

With such the cycle configuration, when the second evaporator (19), in which refrigerant is evaporated at a lower temperature than in the first evaporator (15), is defrosted, the high-pressure refrigerant on the discharge side of the compressor (12) is directly led into the second evaporator (19). Thus, the second evaporator (19) can be effectively defrosted.

According to a fifth example of the present invention, an ejector-type refrigerant cycle device includes: a compressor (12) that sucks and compresses refrigerant; a radiator (13) that radiates heat from high-pressure refrigerant discharged from the compressor (12); an ejector (14) having a nozzle portion (14*a*) that depressurizes and expands refrigerant on a downstream side of the radiator (13), and a refrigerant suction port (14*c*) through which refrigerant is sucked by the flow of refrigerant jetted at high speed from the nozzle portion (14*a*); a first evaporator (15) having a refrigerant outflow side connected to a suction side of the compressor (12); a second evaporator (19) having a refrigerant outflow side connected to the refrigerant suction port (14*c*); a first throttling mechanism (38) that is disposed on a refrigerant outflow side of the first evaporator (15); a second throttling mechanism (18) that is provided on a refrigerant inflow side of the second evaporator (19); and a controlling means (21) that controls an opening of the first throttling mechanism (38) and an opening of the second throttling mechanism (18), and switches an operation mode between a normal operation mode in which low-pressure refrigerant is evaporated at the first evaporator (15) and the second evaporator (19) and a defrosting operation mode in which high-pressure, high-temperature refrigerant on a discharge side of the compressor (12) is introduced into both the second evaporator (19) and the first evaporator (15) to defrost both the evaporators (15, 19).

Thus, in the defrosting operation mode, the high-pressure, high-temperature refrigerant on the discharge side of the compressor (12) can be directly led into the first and second evaporators (15, 19) to defrost the evaporators (15, 19), as illustrated in FIG. 19. Therefore, the function of steadily defrosting the evaporators (15, 19) by the operation of the compressor (12) can be effectively carried out.

In the defrosting operation mode, specifically, the first throttling mechanism (38) can be brought into the state of a predetermined throttle opening, and the second throttling mechanism (18) can be brought into a fully open state.

Thus, the cycle behavior in the defrosting operation mode, illustrated in FIG. 19 as an example, can be set, and a defrosting function can be steadily carried out.

According to a sixth embodiment of the present invention, an ejector-type refrigerant cycle device includes: a compressor (12) that sucks and compresses refrigerant; a radiator (13) that radiates heat from the high-pressure refrigerant discharged from the compressor (12); an ejector (14) having a nozzle portion (14*a*) that depressurizes and expands refrigerant on a downstream side of the radiator (13), and a refrigerant suction port (14*c*) through which refrigerant is sucked by the flow of refrigerant jetted at high speed from the nozzle portion (14*a*); a first evaporator (15) having a refrigerant outflow side connected to the suction side of the compressor (12); a second evaporator (19) having a refrigerant outflow side connected to the refrigerant suction port (14*c*); a first throttling mechanism (18) that is provided on a refrigerant inflow side of the second evaporator (19); a second throttling mechanism (39) that is provided on a refrigerant outflow side of the second evaporator (19); and a controlling means (21) that controls an opening of the first throttling mechanism (18) and an opening of the second throttling mechanism (39), and switches an operation mode between a normal operation mode in which low-pressure refrigerant is evaporated at the first evaporator (15) and the second evaporator (19) and a defrosting and cooling operation mode in which the second evaporator (19) is defrosted and at the same time the first evaporator (15) has a cooling capability. In the refrigerant cycle device, in the defrosting and cooling operation mode, high-pressure, high-temperature refrigerant on a discharge side of the compressor (12) is introduced into the second evaporator (19) to defrost the second evaporator (19), and further high-pressure refrigerant that passed through the second evaporator (19) is depressurized by the second throttling mechanism (39) and low-pressure refrigerant depressurized is introduced into the first evaporator (15) to cause the first evaporator (15) to carry out a cooling function.

Thus, the defrosting and cooling operation mode as illustrated in FIG. 22 as an example, the high-pressure, high-temperature refrigerant on the discharge side of the compressor (12) is led into the second evaporator (19) to defrost the second evaporator (19). At the same time, the high-pressure refrigerant that passed through the second evaporator (19) is reduced in pressure by the second throttling mechanism (39). The low-pressure refrigerant depressurized is led into the first evaporator (15), and the first evaporator (15) can carry out its cooling function. Therefore, the function of defrosting the second evaporator (19) and the cooling function of the first evaporator (15) can be steadily and simultaneously carried out.

In the defrosting and cooling operation mode, for example, the first throttling mechanism (18) is brought into the fully open state, and the second throttling mechanism (39) is brought into the state of a predetermined throttle opening.

Thus, the cycle behavior in the defrosting and cooling operation mode, illustrated in FIG. 22 as an example, can be set, and the defrosting function and the cooling function can be steadily and simultaneously carried out.

According to a seventh embodiment of the present invention, an ejector-type refrigerant cycle device includes: a compressor (12) that sucks and compresses refrigerant; a radiator

(13) the radiates heat from high-pressure refrigerant discharged from the compressor (12); an ejector (14) having a nozzle portion (14a) that depressurizes and expands refrigerant on a downstream side of the radiator (13) and a refrigerant suction port (14c) through which refrigerant is sucked by the flow of refrigerant jetted at high speed from the nozzle portion (14a); a first evaporator (15) having a refrigerant outflow side connected to the suction side of the compressor (12); a second evaporator (19) having a refrigerant outflow side connected to the refrigerant suction port (14c); a throttling mechanism (181) that is provided on a refrigerant inflow side of the second evaporator (19); and a controlling means (21) that switches an operation mode between a normal operation mode in which a state in which heat is radiated from refrigerant in the radiator (13) is set and low-pressure refrigerant is evaporated in the first evaporator (15) and the second evaporator (19), and a defrosting operation mode in which a state in which heat is not radiated from refrigerant at the radiator (13) is set and both the first evaporator (15) and the second evaporator (19) are defrosted. In the refrigerant cycle device, in the defrosting operation mode, refrigerant on a discharge side of the compressor (12) is let to flow into the throttling mechanism (181) in a high-pressure, high-temperature state and depressurized, and a low-pressure, high-temperature vapor phase refrigerant that passed through the throttling mechanism (181) is guided into both the first evaporator (15) and the second evaporator (19).

Thus, in the defrosting and cooling operation mode as illustrated in FIG. 26 as an example, the low-pressure, high-temperature vapor phase refrigerant, depressurized by the throttling mechanism (181), is led into the first evaporator (15) and the second evaporator (19) to simultaneously defrost both the evaporators (15, 19). Therefore, the function of steadily defrosting the evaporators (15, 19) by the operation of the compressor (12) can be effectively carried out.

In this case, the opening of the throttling mechanism (181) is made larger in the defrosting operation mode than in the normal operation mode. Thus, the required flow rate of refrigerant can be ensured even in the defrosting operation mode.

More specific description will be given. In a subcritical cycle in which the radiator (13) functions as a condenser, in the defrosting operation mode, the high-pressure, high-temperature vapor phase refrigerant on the discharge side of the compressor (12) is reduced in pressure by the throttling mechanism (181). Although the density of vapor phase refrigerant is smaller than the density of liquid phase refrigerant, the opening of the throttling mechanism (181) is made larger in the defrosting operation mode than in the normal operation mode. Therefore, the required flow rate of refrigerant can be ensured even in the defrosting operation mode in which vapor phase refrigerant is reduced in pressure by the throttling mechanism (181).

The above-described refrigerant cycle device may be provided with an air blowing means (13a) that blows cooling air to the radiator (13). The air blowing means (13a) may be brought into a stopped state in the defrosting operation mode.

By bringing the air blowing means (13a) for the radiator (13) into a stopped state, the refrigerant on the discharge side of the compressor (12) can be kept at high pressure and high temperature and be introduced to the downstream side of the radiator (13) while only passing through the radiator (13). Therefore, the evaporator defrosting function can be carried out by a simple refrigerant passage configuration without need for a refrigerant passage or the like that bypasses the radiator (13).

The ejector-type refrigerant cycle device in the above-described seventh example may be provided with a radiator bypass passage (40) and a bypassing shut mechanism (41).

The radiator bypass passage (40) bypasses the refrigerant passage of the radiator (13), the bypassing shut mechanism (41) is provided in the radiator bypass passage (40).

In the defrosting operation mode, the high-pressure, high-temperature refrigerant on the discharge side of the compressor (12) may be led into the throttling mechanism (181) through the radiator bypass passage (40) by bringing the bypassing shut mechanism (41) into an open state.

Thus, the high-pressure, high-temperature refrigerant on the discharge side of the compressor (12) can be led into the throttling mechanism (181) through the radiator bypass passage (40) with the air blowing means (13a) for the radiator (13) kept in operation.

The refrigerant outlet portion of the radiator (13) may be provided with a radiator shut mechanism (42) in parallel with the bypassing shut mechanism (41). Further, the radiator (13) may be provided with the air blowing means (13a) for blowing cooling air thereto.

Thus, in the defrosting operation mode, the bypassing shut mechanism (41) is brought into an open state; the radiator shut mechanism (42) is brought into a closed state; and the air blowing means (13a) is brought into an operating state.

Thus, in the defrosting operation mode, the radiator (13) can carry out a liquid storing function. That is, the radiator (13) can condense the high-pressure, high-temperature vapor phase refrigerant on the discharge side of the compressor (12) and store it. For this reason, when the vapor-liquid separator (35) is disposed on the refrigerant outflow side of the first evaporator (15) (the suction side of the compressor (12)), the tank capacity of the vapor-liquid separator (35) can be reduced.

An ejector-type refrigerant cycle device of the present invention may be constructed such that: an ejector shut mechanism (31) is provided in the passage on the upstream side of the ejector (14); and in the defrosting operation mode and in the defrosting and cooling operation mode, the passage on the upstream side of the ejector (14) is brought into a closed state by the ejector shut mechanism (31). Thus, in the defrosting operation mode, the passage on the upstream side of the ejector (14) can be brought into a closed state to prevent refrigerant from flowing from this passage on the upstream side into the ejector (14). As a result, the flow rate of high-temperature refrigerant flowing toward the second evaporator (19) can be increased to enhance defrosting capability.

An ejector-type refrigerant cycle device of the present invention may be provided with a vapor-liquid separator on the refrigerant outflow side of the first evaporator (15). This vapor-liquid separator (35) separates refrigerant into vapor and liquid, and stores liquid phase refrigerant and lets vapor phase refrigerant flow out to the suction side of the compressor (12). In this case, liquid refrigerant can be prevented without fail from returning to the compressor (12) in the defrosting operation mode and in the defrosting and cooling operation mode.

The numerals in parentheses for the above-described means and the means described in Claims indicate correspondence with the concrete means in the embodiments described later.

BRIEF DESCRIPTION OF DRAWINGS

FIG. 1 is a cycle diagram illustrating an ejector-type refrigerant cycle device in a first embodiment of the present invention.

FIGS. 2(a) and 2(b) are drawings schematically illustrating the operation of the throttling mechanism provided with a fully opening function in the first embodiment.

FIGS. 24(a) and 24(b) are drawings schematically illustrating the operation of the throttling mechanism in the 17th embodiment.

FIG. 29 is a table summarizing the operations of various apparatuses in the 19th embodiment.

FIG. 32 is a table summarizing the operations of various apparatuses in the 21st embodiment.

BEST MODE FOR CARRYING OUT THE INVENTION

First Embodiment

Figure 3:
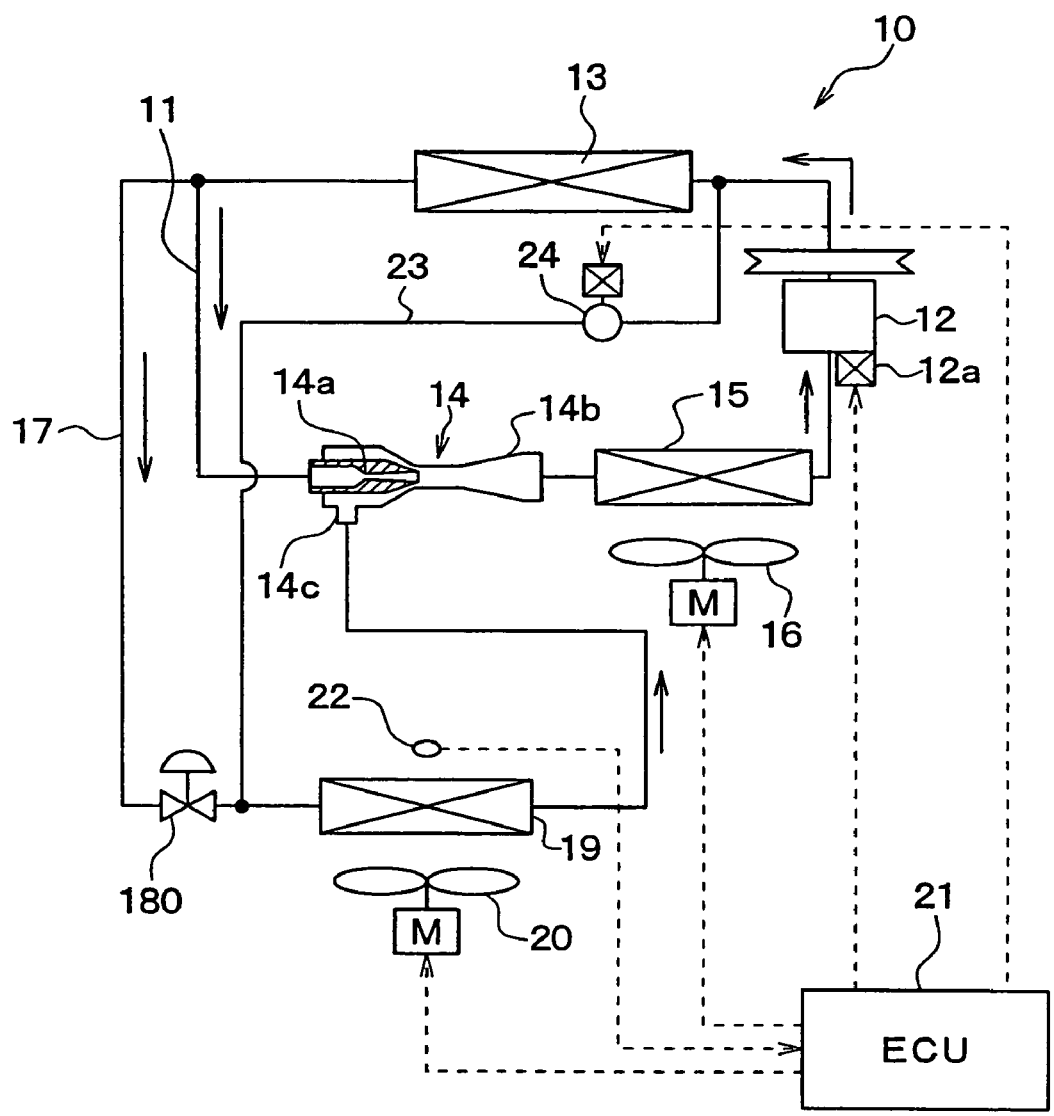
FIG. 3 is a cycle diagram illustrating an ejector-type refrigerant cycle device in a second embodiment.

FIG. 1 illustrates an example in which an ejector-type refrigerant cycle device in the first embodiment of the present invention is applied to a refrigerant cycle for an air conditioner and a refrigerator for vehicles. The ejector-type refrigerant cycle device 10 is provided with a refrigerant circulation path 11. A compressor 12 that sucks and compresses refrigerant is disposed in this refrigerant circulation path 11.

This embodiment is so constructed that this compressor 12 is rotatably driven by an engine (not shown) for a vehicle running through a belt or the like. The embodiment uses as the compressor 12 a variable displacement compressor whose refrigerant discharge capacity can be adjusted through change in discharge volume. Discharge volume of the compressor 12 corresponds to the refrigerant discharge quantity per revolution. The discharge volume can be varied by varying the refrigerant suction volume.

The variable displacement compressor 12 is represented by swash plate type, which is specifically so constructed that the refrigerant suction volume is varied by varying the angle of a swash plate to vary the piston stroke. The angle of the swash plate can be electrically and externally controlled by varying the pressure in the swash plate chamber (control pressure) through an electromagnetic pressure controller 12a that constitutes a displacement control mechanism.

A radiator 13 is disposed on the downstream side of the compressor 12 with respect to the flow of refrigerant. The radiator 13 cools high-pressure refrigerant discharged from the compressor 12 by exchanging heat between the high-pressure refrigerant and outside air (air outside vehicle compartment) blown by a cooling fan (not shown).

An ejector 14 is disposed downstream from the radiator 13 with respect to the flow of refrigerant. This ejector 14 is a pressure reducing means that depressurizes refrigerant, and simultaneously a kinetic pump that fluid-transports by the suction of the flow of refrigerant jetted at high speed.

The ejector 14 includes: a nozzle portion 14a that reduces the area of the passage of high-pressure refrigerant flowing from the radiator 13 and entropically depressurizes and expands the high-pressure refrigerant or the like; and a suction port 14c that is so disposed as to communicate with the refrigerant jet hole in the nozzle portion 14a and sucks refrigerant from a second evaporator 19, described later.

A diffuser portion 14b that makes a pressurizing portion is disposed downstream of the nozzle portion 14a and the suction port 14c with respect to the flow of refrigerant. This diffuser portion 14b is formed in such a shape as to gradually increase the area of the refrigerant passage. The diffuser portion 14b functions to decelerate the flow of refrigerant and increase the pressure of the refrigerant, that is, to convert the velocity energy of refrigerant into pressure energy.

The refrigerant that flowed out of the diffuser portion 14b of the ejector 14 flows into a first evaporator 15. The first evaporator 15 is installed in, for example, an air duct of an air conditioning unit (not shown) in a vehicle compartment, and functions to cool the interior of the vehicle compartment.

More specific description will be given. Air for performing air conditioning of the vehicle compartment is blown to the first evaporator 15 by an electric blower (first blower) 16 of the vehicle-compartment air conditioning unit. The low-pressure refrigerant depressurized by the ejector 14 absorbs heat from the vehicle-compartment air-conditioning air and is evaporated at the first evaporator 15. As a result, the vehicle-compartment air-conditioning air is cooled, and the cooling capability is obtained. The vapor phase refrigerant evaporated at the first evaporator 15 is sucked into the compressor 12, and is circulated in the refrigerant circulation path 11 again.

A branch passage 17 is formed in the ejector-type refrigerant cycle device in this embodiment. This branch passage 17 is branched from the refrigerant circulation path 11 between the radiator 13 and the ejector 14, and is joined to the refrigerant circulation path 11 at the suction port 14c of the ejector 14.

In this branch passage 17, there is provided with a throttling mechanism 18 that adjusts the flow rate of refrigerant and reduces the pressure of the refrigerant. In this embodiment, the throttling mechanism 18 is constructed of a throttling mechanism provided with a fully opening function. FIGS. 2(a) and 2(b) are schematic sectional views illustrating concrete examples of this throttling mechanism 18 provided with a fully opening function. The throttling mechanism 18 is provided with a movable plate member 18c in which a throttle hole 18a, that constitutes a fixed throttle, and a fully opening hole 18b for fully opening the branch passage 17.

The fully opening hole 18b is so designed that it has a sectional area equal to the channel (piping) sectional area of the branch passage 20. Thus, the throttle mechanism 18 carries out the function of fully opening the branch passage 20.

This movable plate member 18c is so disposed that it is movable in the transversal direction of the branch passage 17 (the direction perpendicular to the direction "a" of the flow of refrigerant). The movable plate member 18c is driven by an electric actuator 18d constructed of a servo motor and the like. FIG. 2(a) illustrates the throttling mechanism in a normal operation in which the throttle hole 18a functions as a fixed throttle. FIG. 2(b) illustrates a state in a defrosting operation in which the branch passage 17 is kept in a fully open state by the fully opening hole 18b.

The second evaporator 19 is disposed downstream of the throttling mechanism 18 with respect to the flow of refrigerant. This second evaporator 19 is installed in, for example, a refrigerator (not shown) mounted in a vehicle, and functions to cool the interior of the refrigerator. The refrigerant cycle device is so designed that the air in the refrigerator is blown to the second evaporator 19 by an electric blower (second blower) 20.

This embodiment is so constructed that the electromagnetic pressure controller 12a of the variable displacement compressor 12, the first and second blowers 16, 20, the throttling mechanism 18, and the like are electrically controlled by a control signal from an electric control unit (hereafter, abbreviated as "ECU") 21. A temperature sensor 22 is disposed in a predetermined position in proximity to the second evaporator 19, and the temperature of air in proximity to the second evaporator 19 is detected by this temperature sensor 22. Detection signals from this temperature sensor 22 are inputted to the ECU 21.

Description will be given to the operation of this embodiment constructed as mentioned above. When the compressor 12 is driven by the vehicle engine, refrigerant is compressed and brought into a high temperature, high pressure state by the compressor 12. The refrigerant flows into the radiator 13, and cooled by outside air and condensed. The high-pressure liquid refrigerant flowing out of the radiator 13 is divided into a flow running through the refrigerant circulation path 11 and a flow running through the branch passage 17.

In the normal operation (when the second evaporator 19 need not be defrosted), the throttle mechanism 18 in the branch passage 17 is brought into a normal state, illustrated in FIG. 2(a), by a control signal from the ECU 21. The throttle hole 18a is positioned in the branch passage 17. For this reason, the throttle hole 18a functions as a fixed throttle, and thus the refrigerant passed through the branch passage 17 is reduced in pressure by the throttling mechanism 18 and brought into a low pressure state.

This low-pressure refrigerant absorbs heat from the air in the refrigerator, blown by the second blower 20, in the second evaporator 19, and is evaporated. Thus, the second evaporator 19 functions to cool the interior of the refrigerator.

The flow rate of refrigerant that passes through the first branch passage 17 and flows into the second evaporator 19 can be adjusted by the opening of the throttle hole 18a in the throttling mechanism 18. The cooling capacity of the second evaporator 19 for cooling the space to be cooled (basically, the space in the refrigerator) can be adjusted by controlling the number of revolutions (the quantity of air blown) of the second blower 20 by the ECU 21.

The vapor phase refrigerant that flows out of the second evaporator 19 is sucked into the suction port 14c in the ejector 14. The flow of refrigerant running through the refrigerant circulation path 11 goes into the ejector 14, and depressurized and expanded by the nozzle portion 14a. Therefore, the pressure energy of refrigerant is converted into velocity energy through the nozzle portion 14a, and the refrigerant is accelerated and jetted from the nozzle jet hole. At this time, the pressure drops in proximity to the nozzle portion, thereby the vapor phase refrigerant evaporated at the second evaporator 19 is sucked in through the suction port 14c.

The refrigerant jetted from the nozzle portion 14a and the refrigerant sucked through the suction port 14c are mixed together downstream of the nozzle portion 14a, and flow into the diffuser portion 14b. In this diffuser portion 14b, the velocity (expansion) energy of refrigerant is converted into pressure energy by increase in the area of the passage. Therefore, the pressure of refrigerant is increased in the diffuser portion 14b. The refrigerant that flows out of the diffuser portion 14b of the ejector 14 flows into the first evaporator 15.

In the first evaporator 15, the refrigerant absorbs heat from the air-conditioning air blown into the vehicle compartment and is evaporated. The evaporated vapor phase refrigerant is sucked into the compressor 12 and compressed there, and is circulated through the refrigerant circulation path 11 again. The ECU 21 can control the refrigerant discharge capacity of the compressor 12 by controlling the displacement of the compressor 12.

Thus, the quantity of refrigerant flowing to the first evaporator 15 is adjusted, and further the number of revolutions (the quantity of blown air) of the first blower 26 is controlled. Consequently, the cooling capacity of the first evaporator 15 for cooling the space to be cooled, specifically, the vehicle compartment can be controlled.

The refrigerant evaporating pressure of the first evaporator 15 is a pressure increased through the diffuser portion 14b, and the outlet of the second evaporator 19 is connected to the suction port 14c in the ejector 14. Therefore, the lowest pressure obtained immediately after depressurization at the nozzle portion 14a can be exerted on the second evaporator 19.

Thus, the refrigerant evaporating pressure (refrigerant evaporating temperature) of the second evaporator 19 can be made lower than the refrigerant evaporating pressure (refrigerant evaporating temperature) of the first evaporator 15. Therefore, cooling capacity in a relatively high temperature range, suitable for cooling the interior of the vehicle compartment, can be obtained by the first evaporator 15. At the same time, cooling capacity in a relatively low temperature range, suitable for cooling the interior of the refrigerator, can be obtained by the second evaporator 19.

There are cases where the second evaporator 19 is operated under conditions of the refrigerant evaporating temperature of 0° C. or below. This causes a problem of degradation in cooling performance due to frost (frosting) on the second evaporator 19.

To cope with this, this embodiment is constructed such that a temperature sensor 22 is disposed in proximity to the second evaporator 19, and based on the temperature detected by this temperature sensor 22, it is determined by the ECU 21 whether the second evaporator 19 is frosted or not. Thus, the second evaporator 19 is automatically defrosted.

More specific description will be given. When the temperature of air in proximity to the second evaporator 19, detected by the temperature sensor 22, falls to a preset frost determination temperature Ta or below, the ECU 21 determines that the second evaporator 19 is frosted. In this case, the ECU 21 outputs a control signal to the electric actuator 18d for the throttling mechanism 18 provided with the fully opening function. The electric actuator 18d shifts the movable plate member 18c from the normal position illustrated in FIG. 2(a) to the defrosting position illustrated in FIG. 2(b).

Thus, the fully opening hole 18b in the movable plate member 18c is superposed on the entire sectional area of the branch passage 17, and the branch passage 17 is brought into a fully open state. As a result, the high-temperature, high-pressure liquid refrigerant at the outlet of the radiator 13 can be directly led to the second evaporator 19 through the branch passage 17. Thus, the frost that has formed on the surface of the second evaporator 19 can be melted, and the operation of defrosting the second evaporator 19 can be performed by a very simple construction.

Execution of this defrosting operation raises the temperature of air in proximity to the second evaporator 19. When this temperature rises to a defrosting termination temperature Tb, higher than the frost determination temperature Ta by a predetermined temperature α (Tb=Ta+α), the ECU 21 determines that defrosting is completed. In this case, the ECU 21 outputs a control signal for return to the normal position to the electric actuator 18d for the throttling mechanism 18 provided with the fully opening function.

Thus, the electric actuator 18d returns the movable plate member 18c from the defrosting position illustrated in FIG. 2(b) to the normal position illustrated in FIG. 2(a). For this reason, the throttling mechanism 18 functions as a fixed throttle through the throttle hole 18a, and thus the second evaporator 19 is also returned to a state in which it exerts the cooling operation.

Second Embodiment

FIG. 3 illustrates a second embodiment, and in the following description, the same members as in the first embodiment will be indicated with the same numerals and the description thereof will be omitted. In the second embodiment, a bypass passage 23 is formed which directly connects the passage on the discharge side of the compressor 12 and the inlet portion of the second evaporator 19. A shut mechanism 24 is provided in this bypass passage 23. Specifically, this shut mechanism 24 can be constructed of a normally closed electromagnetic valve that is opened only when energized.

In the second embodiment, the shut mechanism 24 is kept in a shut state by a control signal from the ECU 21 in the normal operation (when the second evaporator 19 need not be defrosted). For this reason, in the normal operation, refrigerant is not passed through the bypass passage 23, and thus the same refrigerant cycle operation as in the first embodiment is performed by the operation of the compressor 12. As a result, the cooling capacity in a relatively high temperature range, suitable for cooing the interior of the vehicle compartment, can be obtained by the first evaporator 15. At the same time, the cooling capacity in a relatively low temperature range, suitable for cooling the interior of the refrigerator, can be obtained by the second evaporator 19.

When the temperature of air in proximity to the second evaporator 19, detected by the temperature sensor 22, falls to a preset frost determination temperature Ta or below, the ECU 21 determines that the second evaporator 19 is frosted. In this case, the ECU 21 outputs a control signal to the shut mechanism 24 to open the shut mechanism 24.

As a result, the high-temperature, high-pressure vapor phase refrigerant on the discharge side of the compressor 12 passes through the bypass passage 23 and flows into the second evaporator 19. Therefore, the frost that has formed on the surface of the second evaporator 19 can be melted, and the operation of defrosting the second evaporator 19 can be performed by a very simple construction. The completion of defrosting can be determined by the same procedure as in the first embodiment, and the shut mechanism 24 is returned to a shut state.

In the second embodiment, a throttling mechanism 180 in the branch passage 17 need not be provided with a fully opening function. Therefore, it can be constructed using an ordinary fixed throttle or variable throttle.

Third Embodiment

Figure 4:
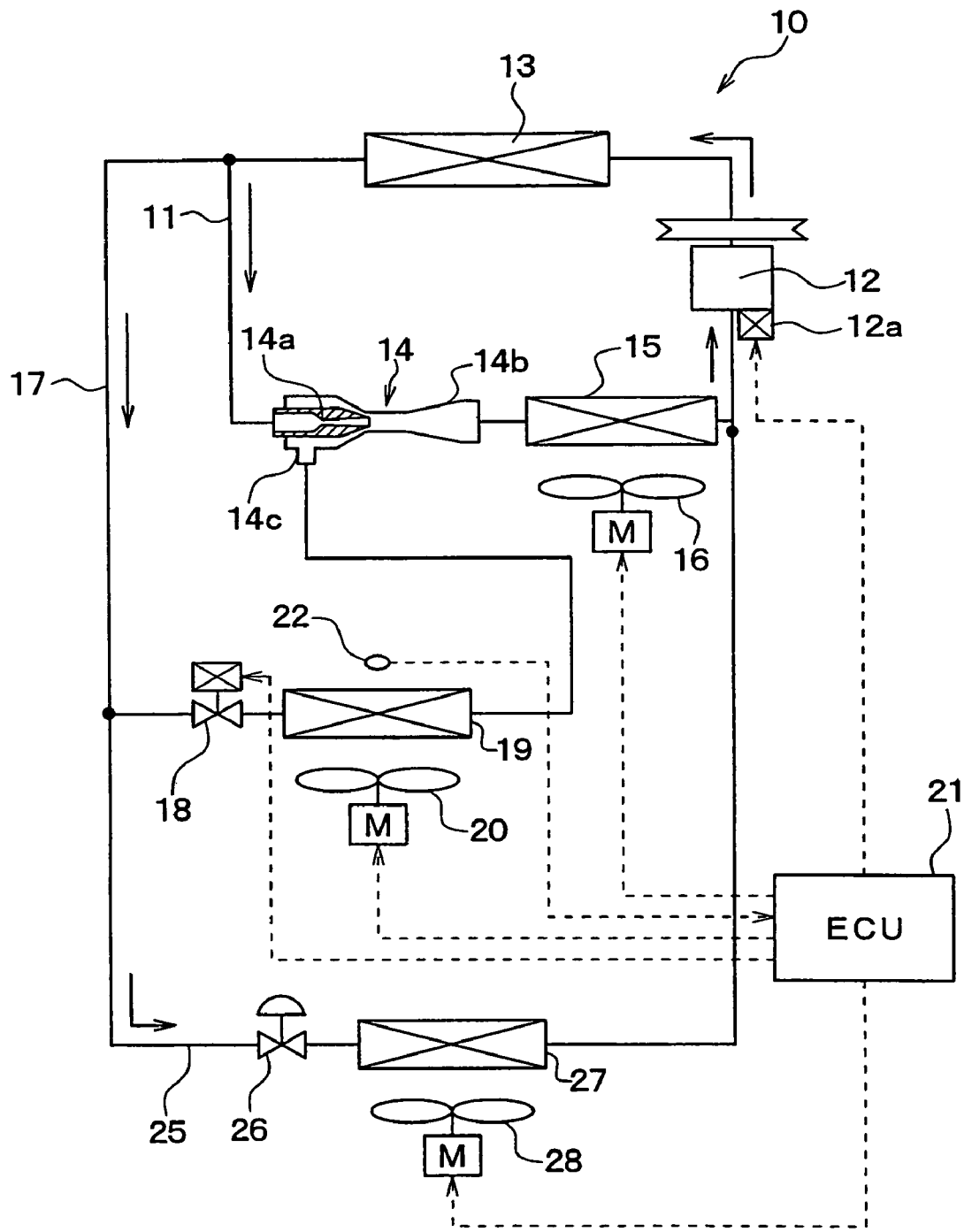
FIG. 4 is a cycle diagram illustrating an ejector-type refrigerant cycle device in a third embodiment.

FIG. 4 illustrates the third embodiment, which is a modification to the first embodiment. In the third embodiment, a second branch passage 25 is added to the construction of the first embodiment. The second branch passage 25 connects the portion of the branch passage 17 on the upstream side of the throttling mechanism 18 provided with the fully opening function and a point between the first evaporator 15 and the compressor 12.

In the second branch passage 25, there is provided with a throttling mechanism 26 that reduces the pressure of refrigerant and a third evaporator 27 positioned downstream from the throttling mechanism 26 with respect to the flow of refrigerant. Since the throttling mechanism 26 need not be provided with a fully opening function, it can be constructed using an ordinary fixed throttle or variable throttle. Air in the space to be cooled is blown to the third evaporator 27 by an electric blower (third blower) 28. The operation of this third blower 28 is also controlled by the ECU 21.

In the third embodiment, the downstream side of the third evaporator 27 is hooked up to the downstream side of the first evaporator 15, and then connected to the suction side of the compressor 12. Therefore, the refrigerant evaporating pressures of the first and third evaporators 15, 27 are substantially equal to the inlet pressure of the compressor 12. Accordingly, the refrigerant evaporating temperatures of the first and third evaporators 15, 27 are identical with each other, and thus the first and third evaporators 15, 27 exert the cooling operation in the same temperature range.

Also in the third embodiment, the refrigerant evaporating temperature of the second evaporator 19 is lower than the refrigerant evaporating temperature of the first and third evaporators 15, 27. However, the second evaporator 19 can be defrosted as in the first embodiment by bringing the throttling mechanism 18 provided with the fully opening function into a fully open state.

A concrete example of the spaces to be cooled by the first to third evaporators 15, 19, 27 in the third embodiment can be shown in the following case: the front seat area in a vehicle compartment is cooled with the first evaporator 15; the rear seat area in the vehicle compartment is cooled with the third evaporator 27; and the interior of a refrigerator is cooled with the second evaporator 19.

Fourth Embodiment

Figure 5:
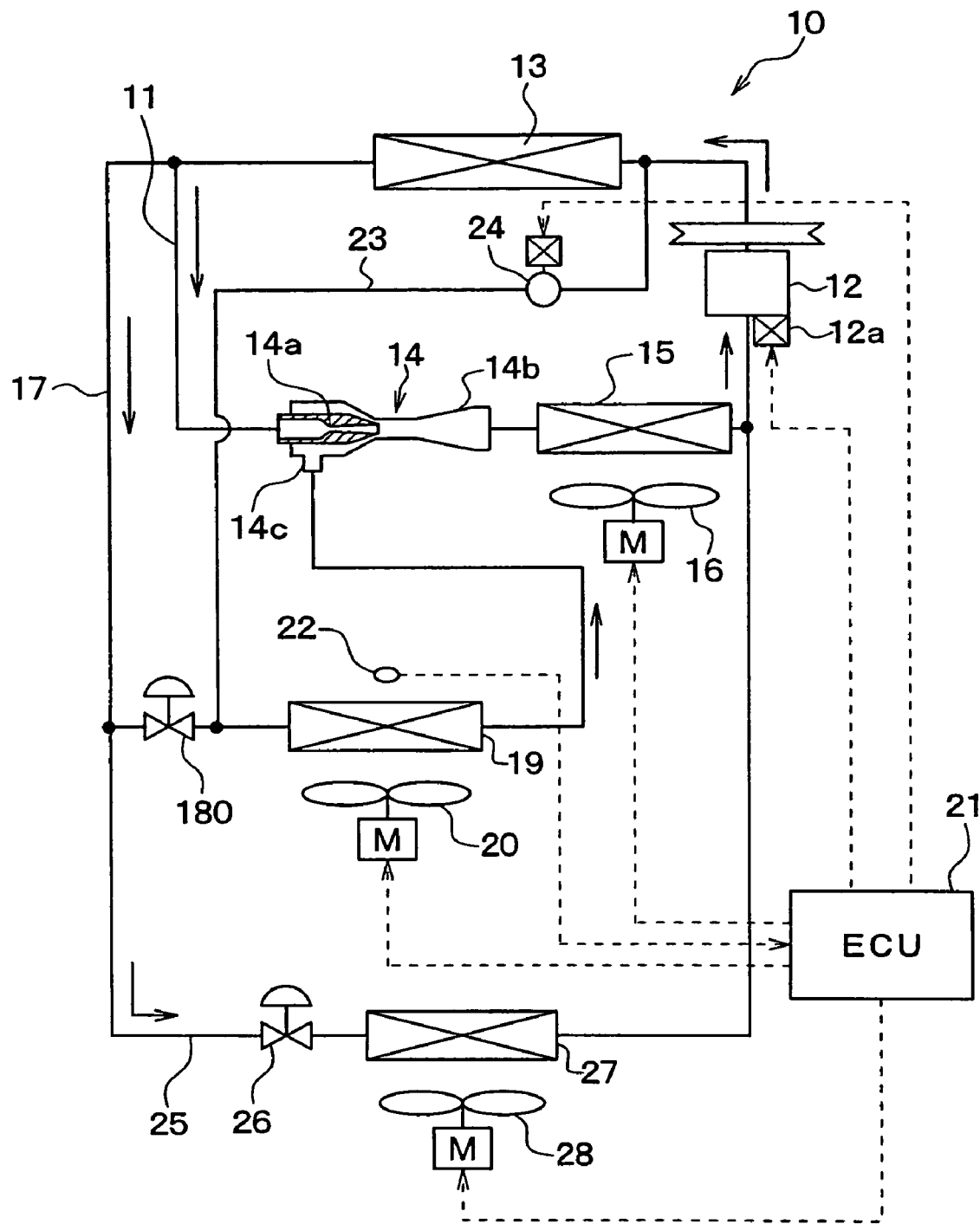
FIG. 5 is a cycle diagram illustrating an ejector-type refrigerant cycle device in a fourth embodiment.

FIG. 5 illustrates a fourth embodiment, which is a modification to the second embodiment (FIG. 3). More specific description will be given. In the fourth embodiment, on the construction of the second embodiment, a second branch passage 25 is added so as to connect a portion of the branch passage 17 located upstream of the throttling mechanism 180 and a portion between the first evaporator 15 and the compressor 12. The throttling mechanism 26 and the third evaporator 27 are disposed in the second branch passage 25. The throttling mechanism 26 and the third evaporator 27 are identical with those in the third embodiment.

In the fourth embodiment constructed as mentioned above, the second evaporator 19 can be defrosted by using the bypass passage 23 and the shut mechanism 24 as in the second embodiment. Further, the cooling capacity of the third evaporator 27 can be obtained as in the third embodiment.

Fifth Embodiment

Figure 6:
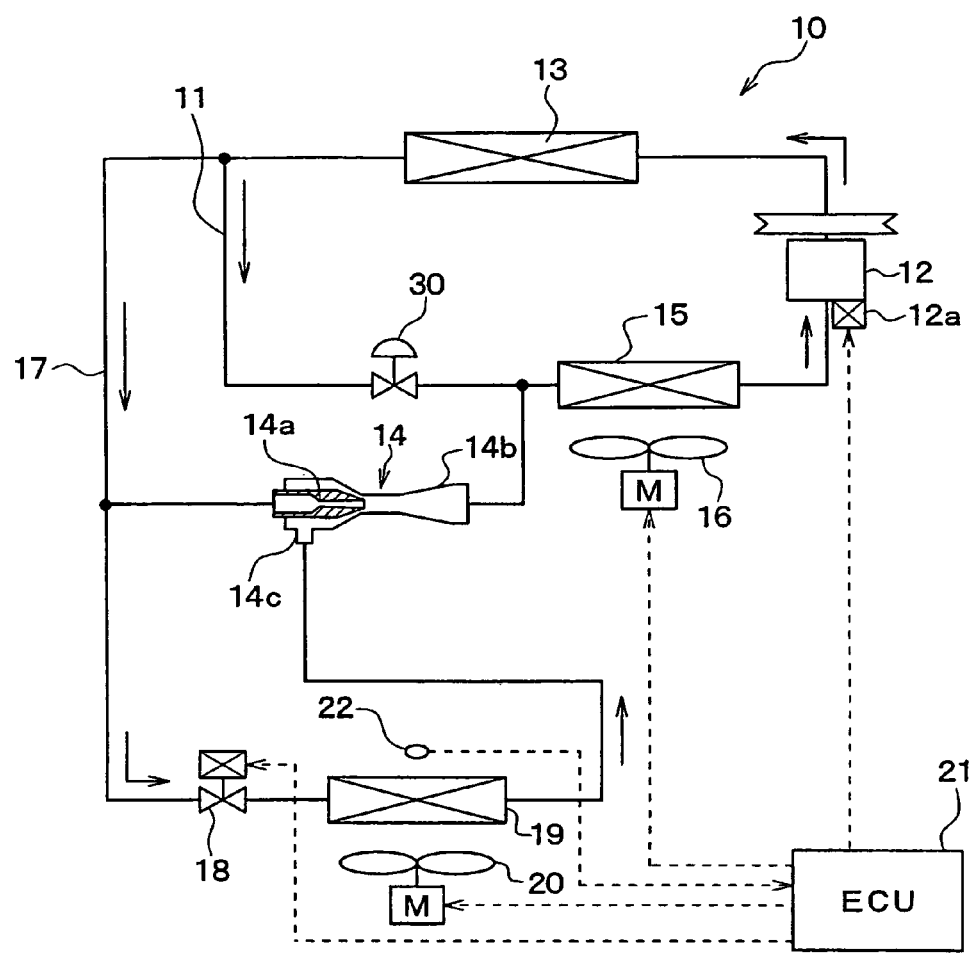
FIG. 6 is a cycle diagram illustrating an ejector-type refrigerant cycle device in a fifth embodiment.

FIG. 6 illustrates the fifth embodiment, which is a modification to the first embodiment. More specific description will be given. In the fifth embodiment, a dedicated throttling mechanism 30 is added to the area located upstream of the first evaporator 15, so that the ejector 14 is disposed in parallel with the throttling mechanism 30. Various items can be used for the throttling mechanism 30. For example, a temperature expansion valve is suitable which controls the degree of superheat of refrigerant at the outlet of the first evaporator 15 to a predetermined value.

The throttling mechanism 18 provided with the fully opening function is disposed upstream of the second evaporator 19. When the second evaporator 19 requires defrosting, the throttling mechanism 18 is fully opened to perform the operation of defrosting the second evaporator 19. This is the same as in the first embodiment.

Description will be given to the features of the fifth embodiment in comparison with the first embodiment. In any of the first to fourth embodiments, the ejector 14 and the first evaporator 15 are connected in series with each other. Therefore, the ejector 14 carries out the function of regulating the refrigerant flow rate of the first evaporator 15, and further carries out the function of pump to produce a refrigerant pressure difference between the first evaporator 15 and the second evaporator 19.

In designing the ejector 14, therefore, both the specification requirements for the refrigerant flow-rate regulating function and for the pump function must be met. To ensure the function of regulating the refrigerant flow rate of the first evaporator 15, the design of the ejector inevitably depends on the first evaporator 15. As a result, a problem arises. It is difficult to operate the ejector-type refrigerant cycle device with high accuracy.

To cope with this, the fifth embodiment takes such a measure as illustrated in FIG. 6. The dedicated throttling mechanism 30 is disposed upstream of the first evaporator 15 so that the ejector 14 need not be in charge of the function of regulating the refrigerant flow rate of the first evaporator 15. For this reason, the ejector 14 can be specialized in the pump function to produce a refrigerant pressure difference between the first evaporator 15 and the second evaporator 19.

Thus, the shape of the ejector 14 can be optimally designed so that a predetermined pressure difference is produced between the first and second evaporators 15, 19. In other words, it can be optimally designed so that the flow rate of refrigerant passed through the ejector 14 becomes a predetermined flow rate. As a result, the ejector-type refrigerant cycle device can be operated with high efficiency even if cycle operating conditions (number of compressor revolutions, ambient temperature, temperature of space to be cooled, etc.) fluctuates over a wide range.

Sixth Embodiment

Figure 7:
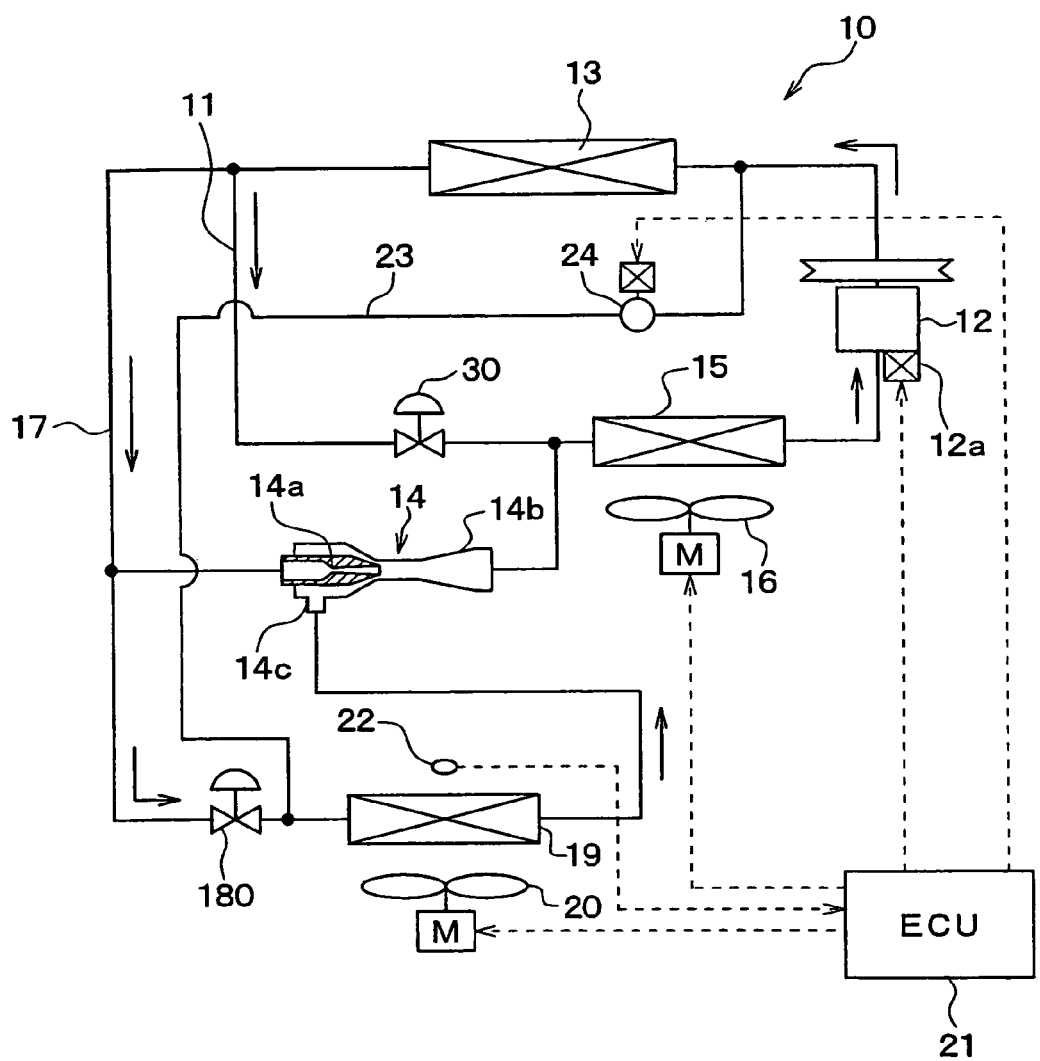
FIG. 7 is a cycle diagram illustrating an ejector-type refrigerant cycle device in a sixth embodiment.

FIG. 7 illustrates a sixth embodiment, which is a modification to the second embodiment (FIG. 3). More specific description will be given. Like the second embodiment, the sixth embodiment has a cycle configuration including the bypass passage 23 and the shut mechanism 24 for the operation of defrosting the second evaporator 19. Further, a dedicated throttling mechanism 30 is added to the area located upstream of the first evaporator 15, and the ejector 14 is connected in parallel with this throttling mechanism 30.

This construction in which the throttling mechanism 30 and the ejector 14 are in parallel connection is the same as in the fifth embodiment (FIG. 6). Therefore, the sixth embodiment can produce the function and effect that would be produced by a combination of the second embodiment and the fifth embodiment.

Seventh Embodiment

Figure 8:
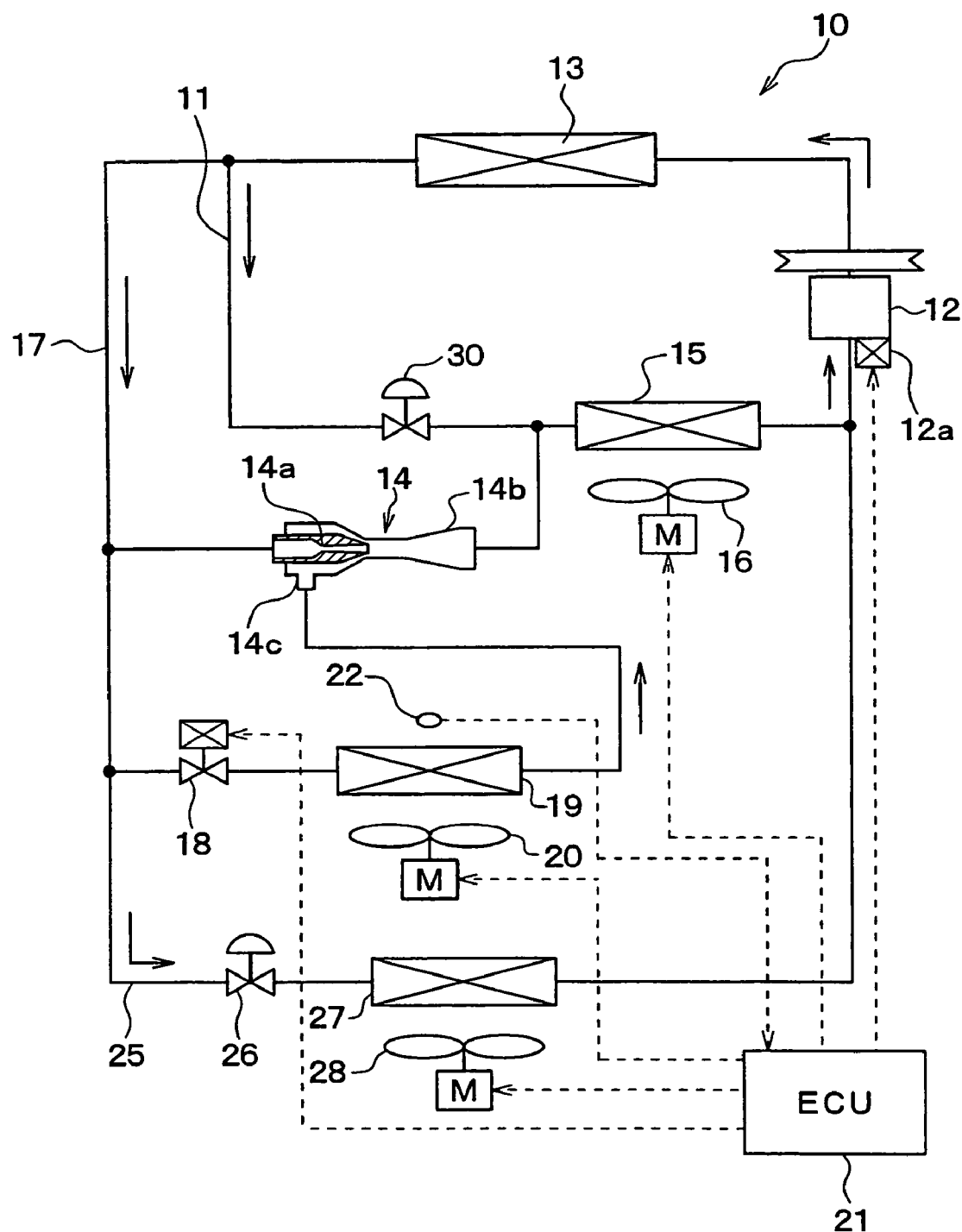
FIG. 8 is a cycle diagram illustrating an ejector-type refrigerant cycle device in a seventh embodiment.

FIG. 8 illustrates the seventh embodiment, which is a modification to the third embodiment (FIG. 4). More specific description will be given. Like the third embodiment, the seventh embodiment has a cycle configuration in which a throttling mechanism 18 provided with a fully opening function for defrosting operation is disposed upstream of the second evaporator 19; at the same time, the throttling mechanism 26 and the third evaporator 27 are provided. Further, a dedicated throttling mechanism 30 is added to the area located upstream of the first evaporator 15, and the ejector 14 is connected in parallel with this throttling mechanism 30.

This parallel connection of the ejector 14 is the same as in the fifth embodiment (FIG. 6). Therefore, the seventh embodiment can produce the function and effect that would be produced by a combination of the third embodiment and the fifth embodiment.

Eighth Embodiment

Figure 9:
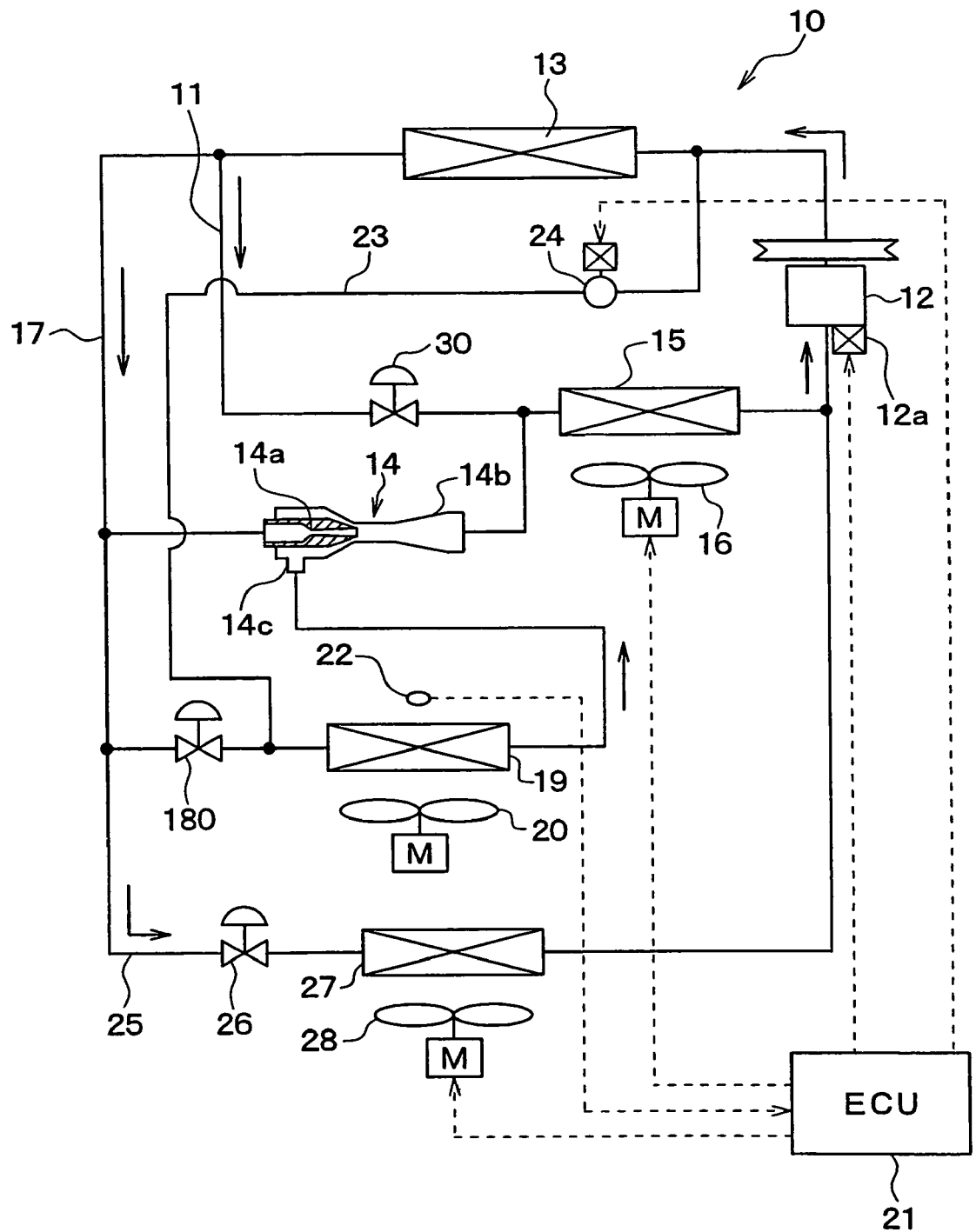
FIG. 9 is a cycle diagram illustrating an ejector-type refrigerant cycle device in an eighth embodiment.

FIG. 9 illustrates the eighth embodiment, which is a modification to the fourth embodiment (FIG. 5). More specific description will be given. Like the fourth embodiment, the eighth embodiment has a cycle configuration in which the bypass passage 23 and the shut mechanism 24 for the operation of defrosting the second evaporator 19 are provided; at the same time, the throttling mechanism 26 and the third evaporator 27 are provided. Further, a dedicated throttling mechanism 30 is added to the area located upstream of the first evaporator 15, and the ejector 14 is connected in parallel with this throttling mechanism 30.

This parallel connection of the ejector 14 is the same as in the fifth embodiment (FIG. 6). Therefore, the eighth embodiment can produce the function and effect that would be produced by a combination of the fourth embodiment and the fifth embodiment.

Ninth Embodiment

Figure 10:
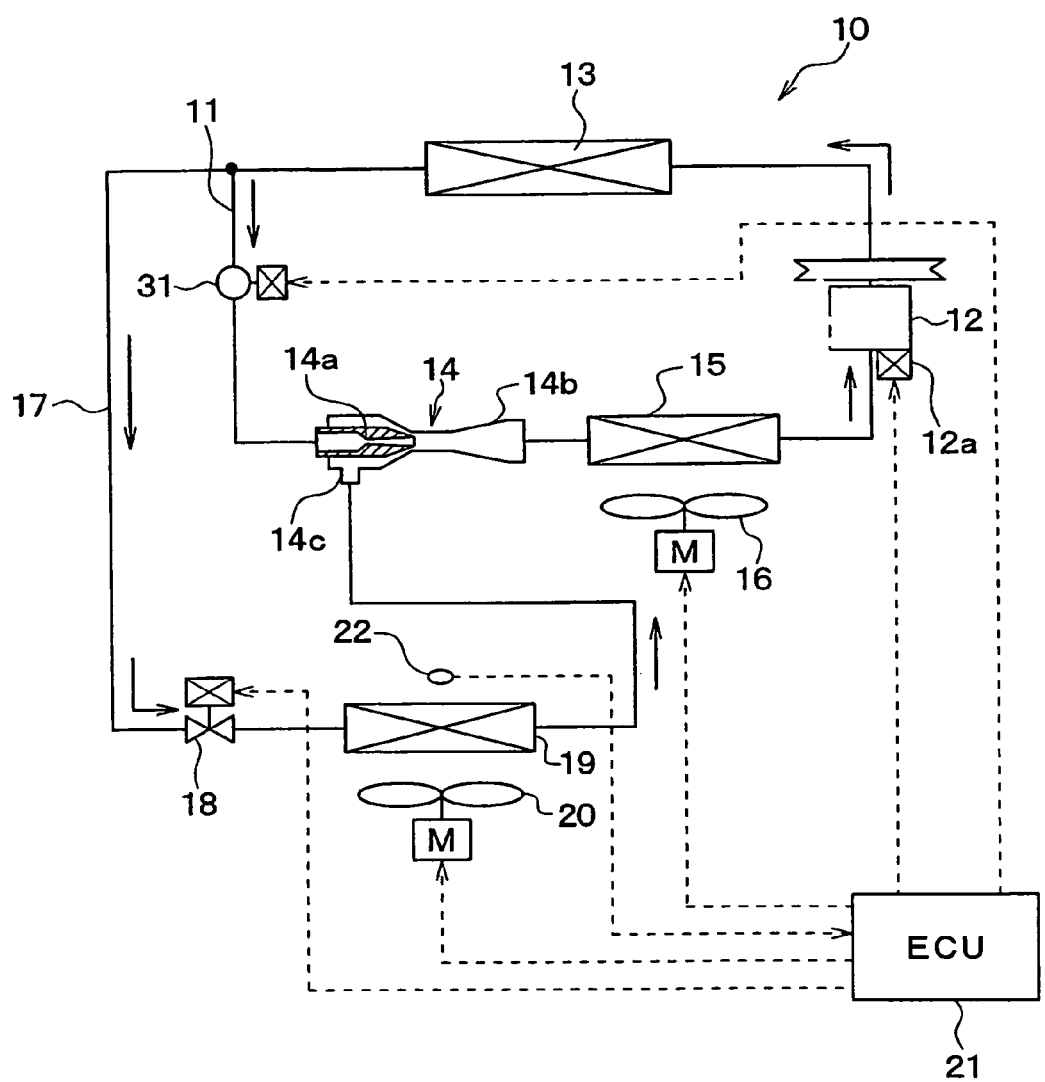
FIG. 10 is a cycle diagram illustrating an ejector-type refrigerant cycle device in a ninth embodiment.

FIG. 10 illustrates the ninth embodiment, which is a modification to the first embodiment. More specific description will be given. In the ninth embodiment, on the cycle configuration of the first embodiment, a shut mechanism 31 is additionally provided in the portion of the refrigerant circulation path 11 located upstream of the ejector 14. Specifically, this shut mechanism 31 can be constructed of a normally open electromagnetic valve that is closed only when energized.

According to the ninth embodiment, the shut mechanism 31 is kept in a fully open state by a control signal from the ECU 21 in the normal operation (when the second evaporator 19 need not be defrosted). Therefore, the ejector-type refrigerant cycle device 10 performs the same operation as in the first embodiment.

When it is determined by the ECU 21 based on the temperature of air in proximity to the second evaporator 19, detected by the temperature sensor 22, that the second evaporator 19 is frosted, the following takes place: the ECU 21 outputs a control signal to the shut mechanism 31 to bring the shut mechanism 31 into a shut (fully closed) state. At the same time, the ECU 21 outputs a control signal to the throttling mechanism 18 provided with the fully opening function to bring the throttling mechanism 18 into a fully open state.

During this defrosting operation, the refrigerant circulation path 11 is brought into a shut state by the shut mechanism 31. Therefore, all of the high-temperature, high-pressure refrigerant at the outlet of the radiator 13 passes through the throttling mechanism 18 and flows into the second evaporator 19. As a result, the defrosting capability can be enhanced as compared with the first embodiment, and defrosting of the second evaporator 19 can be completed in a short time.

10th Embodiment

Figure 11:
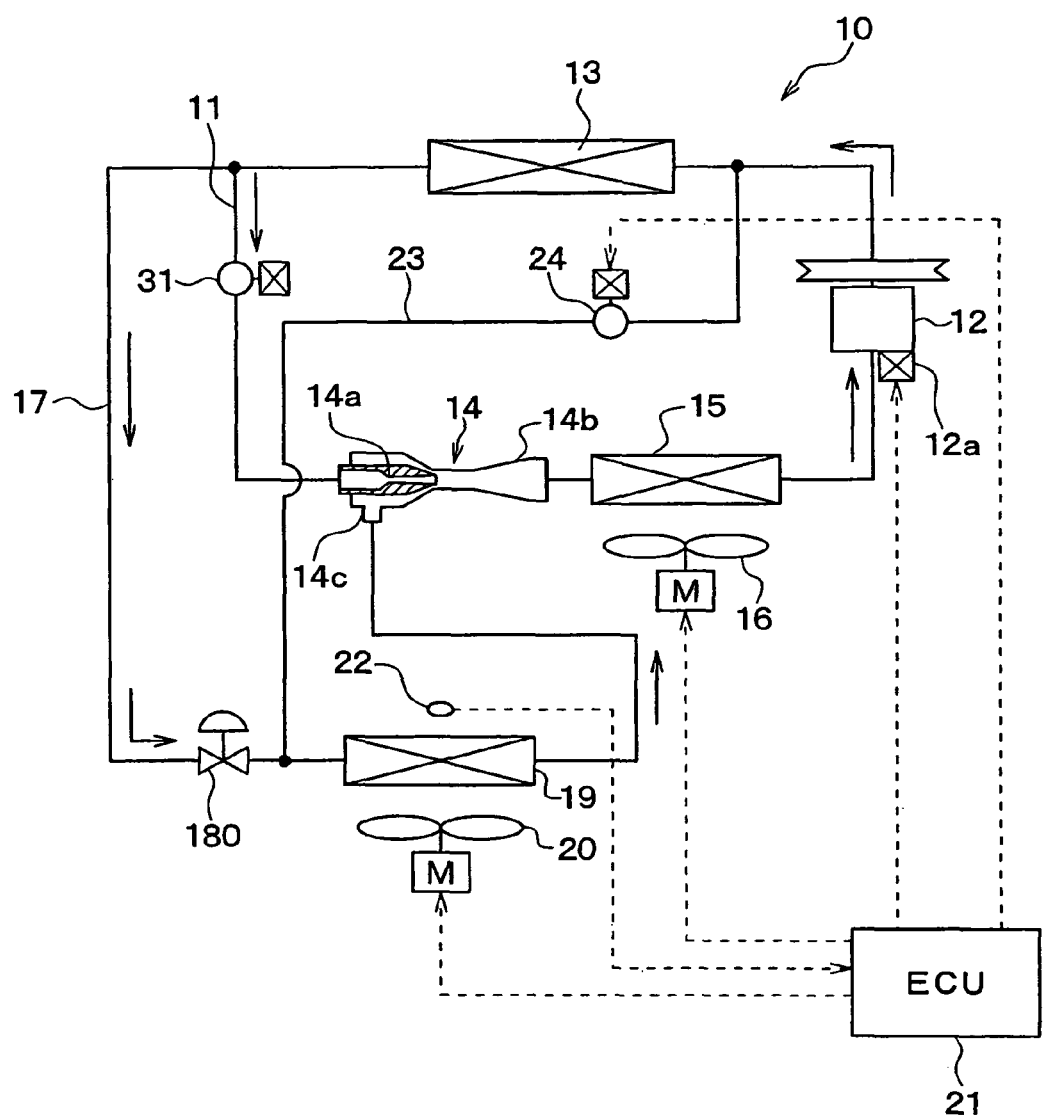
FIG. 11 is a cycle diagram illustrating an ejector-type refrigerant cycle device in a 10th embodiment.

FIG. 11 illustrates the 10th embodiment, which is a modification to the second embodiment (FIG. 3). More specific description will be given. In the 10th embodiment, on the cycle configuration of the second embodiment, a shut mechanism 31 is additionally provided in the portion of the refrigerant circulation path 11 located upstream of the ejector 14. Specifically, this shut mechanism 31 can be constructed of a normally open electromagnetic valve that is closed only when energized.

According to the 10th embodiment, the shut mechanism 31 is kept in a fully open state by a control signal from the ECU 21 in the normal operation (when the second evaporator 19 need not be defrosted). Therefore, the ejector-type refrigerant cycle device 10 performs the same operation as in the second embodiment.

When it is determined by the ECU 21 based on the temperature of air in proximity to the second evaporator 19, detected by the temperature sensor 22, that the second evaporator 19 is frosted, the following takes place: the ECU 21 outputs a control signal to the shut mechanism 31 to bring the shut mechanism 31 into a shut (fully closed) state. At the same time, the ECU 21 outputs a control signal to the shut mechanism 24 in the bypass passage 23 to bring the shut mechanism 24 into a fully open state.

During this defrosting operation, the refrigerant circulation path 11 is brought into a shut state by the shut mechanism 31. Therefore, the quantity of high-temperature, high-pressure vapor phase refrigerant on the discharge side of the compressor 12, which passes through the bypass passage 23 and flows into the second evaporator 19, is increased. As a result, the defrosting capability can be enhanced as compared with the second embodiment, and defrosting of the second evaporator 19 can be completed in a short time.

11th Embodiment

Figure 12:
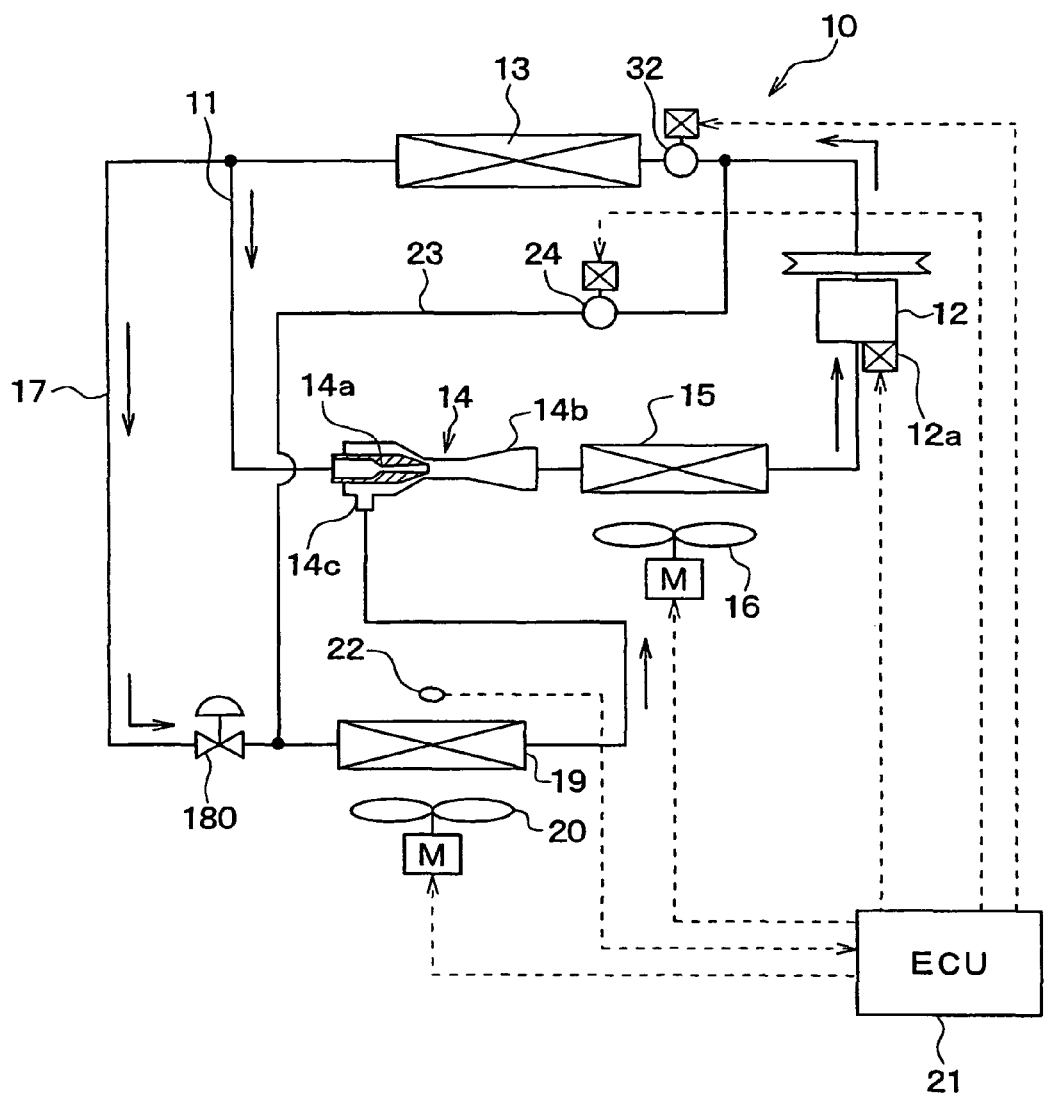
FIG. 12 is a cycle diagram illustrating an ejector-type refrigerant cycle device in an 11th embodiment.

FIG. 12 illustrates an 11th embodiment, which is a modification to the 10th embodiment (FIG. 11). More specific description will be given. In the 11th embodiment, a shut mechanism 32 corresponding to the shut mechanism 31 in the 10th embodiment is provided upstream of the radiator 13. Specifically, this shut mechanism 32 can also be constructed of a normally open electromagnetic valve as the shut mechanism 31 in the ninth and 10th embodiments.

In the 11th embodiment, when it is determined by the ECU 21 based on the temperature of air in proximity to the second evaporator 19 that the second evaporator 19 is frosted, the ECU 21 outputs a control signal to the shut mechanism 32 to bring the shut mechanism 32 into a shut (fully closed) state. At the same time, the ECU 21 outputs a control signal to the shut mechanism 24 in the bypass passage 23 to bring the shut mechanism 24 into a fully open state.

During this defrosting operation, the passage located upstream of the radiator 13 is brought into a shut state by the shut mechanism 32. Therefore, all of the high-temperature, high-pressure vapor phase refrigerant on the discharge side of the compressor 12 passes through the bypass passage 23 and flows into the second evaporator 19. Thus, the defrosting capability can be further enhanced than in the 10th embodiment.

In the 11th embodiment, the two shut mechanisms 24, 32 may be constructed of one passage switching mechanism of three-way valve type.

12th Embodiment

Figure 13:
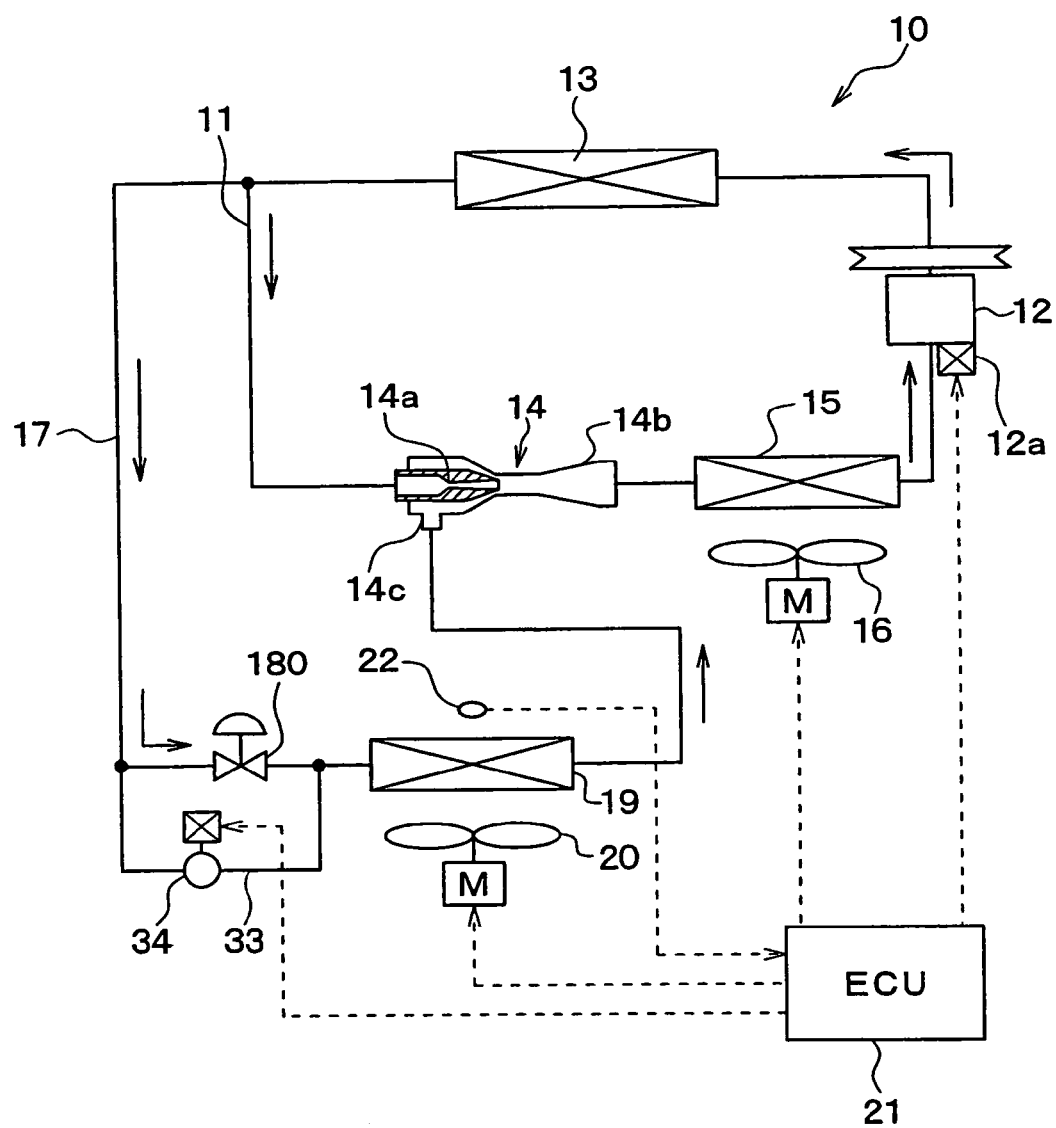
FIG. 13 is a cycle diagram illustrating an ejector-type refrigerant cycle device in a 12th embodiment.

FIG. 13 illustrates the 12th embodiment, which is a modification to the first embodiment. Specifically, the 12th embodiment uses a throttling mechanism 180 constructed of an ordinary fixed throttle or variable throttle not provided with a fully opening function in place of the throttling mechanism provided with the fully opening function in the first embodiment.

A bypass passage 33 is provided in parallel with this throttling mechanism 180, and a shut mechanism 34 is provided in the bypass passage 33. Specifically, this shut mechanism 34 can be constructed of a normally closed electromagnetic valve that is opened only when energized.

According to the 12th embodiment, the shut mechanism 34 is kept in a shut (fully closed) state by a control signal from the ECU 21 in the normal operation (when the second evaporator 19 need not be defrosted). Therefore, the quantity of refrigerant flowing into the second evaporator 19 is regulated by the throttling mechanism 180.

When the second evaporator 19 is determined to be frosted (in the defrosting operation), the shut mechanism 34 is switched to transition to a fully open state by a control signal from the ECU 21. Thus, the high-temperature, high-pressure liquid refrigerant at the outlet of the radiator 13 passes through the bypass passage 33 and flows into the second evaporator 19 in the defrosting operation. As a result, the second evaporator 19 can be defrosted.

Up to this point, the 12th embodiment has been described as a modification to the first embodiment. The idea of the 12th embodiment can be similarly used in other embodiments (third, fifth, seventh, and ninth embodiments) including the throttling mechanism 18 provided with the fully opening function than the first embodiment. The defrosting operation can be performed by providing the ordinary throttling mechanism 180 not provided with the fully opening function, the bypass passage 33 and the shut mechanism 34, in place of the throttling mechanism 18 provided with the fully opening function.

13th Embodiment

Any of the first to 12th embodiments is so constructed that the branch passage 17, branched at the outlet side of the radiator 13 and connected to the suction port 14c of the ejector 14, is formed and the throttling mechanisms 18, 180 and the second evaporator 19 are disposed in this branch passage 17. In the 13th embodiment, the second evaporator 19 is disposed differently from that in each of the above embodiments.

Figure 14:
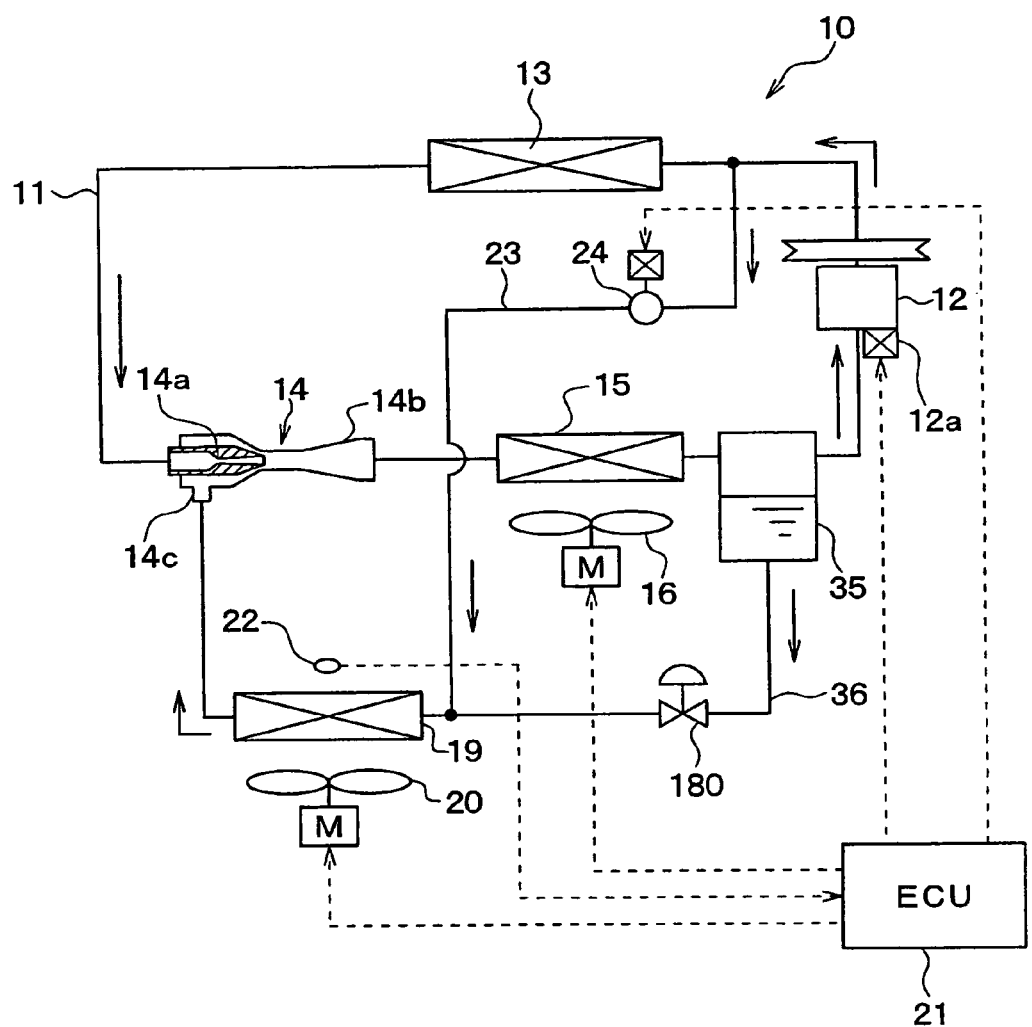
FIG. 14 is a cycle diagram illustrating an ejector-type refrigerant cycle device in a 13th embodiment.

More specific description will be given. In the 13th embodiment, a vapor-liquid separator 35 is disposed between the refrigerant outflow side of the first evaporator 15 and the suction side of the compressor 12, as illustrated in FIG. 14. The vapor-liquid separator 35 separates the refrigerant at the outlet of the first evaporator 15 into vapor and liquid, and stores the liquid phase refrigerant therein. The 13th embodiment is so constructed that the vapor phase refrigerant separated by the vapor-liquid separator 35 is led out to the suction side of the compressor 12, and the liquid phase refrigerant separated by the vapor-liquid separator 35 is led out to a branch passage 36.

This branch passage 36 is a passage that connects the liquid refrigerant outlet in proximity to the bottom of the vapor-liquid separator 35 and the suction port 14c of the ejector 14. The throttling mechanism 180 is provided on the upstream side of the branch passage 36, and the second evaporator 19 is disposed downstream of the throttling mechanism 180. The throttling mechanism 180 is constructed of an ordinary fixed throttle or variable throttle not provided with a fully opening function.

The downstream end of a bypass passage 23 including the shut mechanism 24 is connected to the branch passage 36 between the throttling mechanism 180 and the second evaporator 19.

Also in the cycle configuration of the 13th embodiment, the refrigerant evaporating pressure (refrigerant evaporating temperature) of the second evaporator 19 is lower than the refrigerant evaporating pressure (refrigerant evaporating temperature) of the first evaporator 15. Therefore, the cooling operation in a high temperature range can be performed by the first evaporator 15, and the cooling operation in a low temperature range can be performed by the second evaporator 19.

When the second evaporator 19 is determined to be frosted, the shut mechanism 24 in the bypass passage 23 is opened by a control signal from the ECU 21. As a result, the high-temperature, high-pressure vapor phase refrigerant on the discharge side of the compressor 12 passes through the bypass passage 23 and flows into the second evaporator 19 through the bypass passage 23. Therefore, the second evaporator 19 can be defrosted.

14th Embodiment

Figures 15, 16:
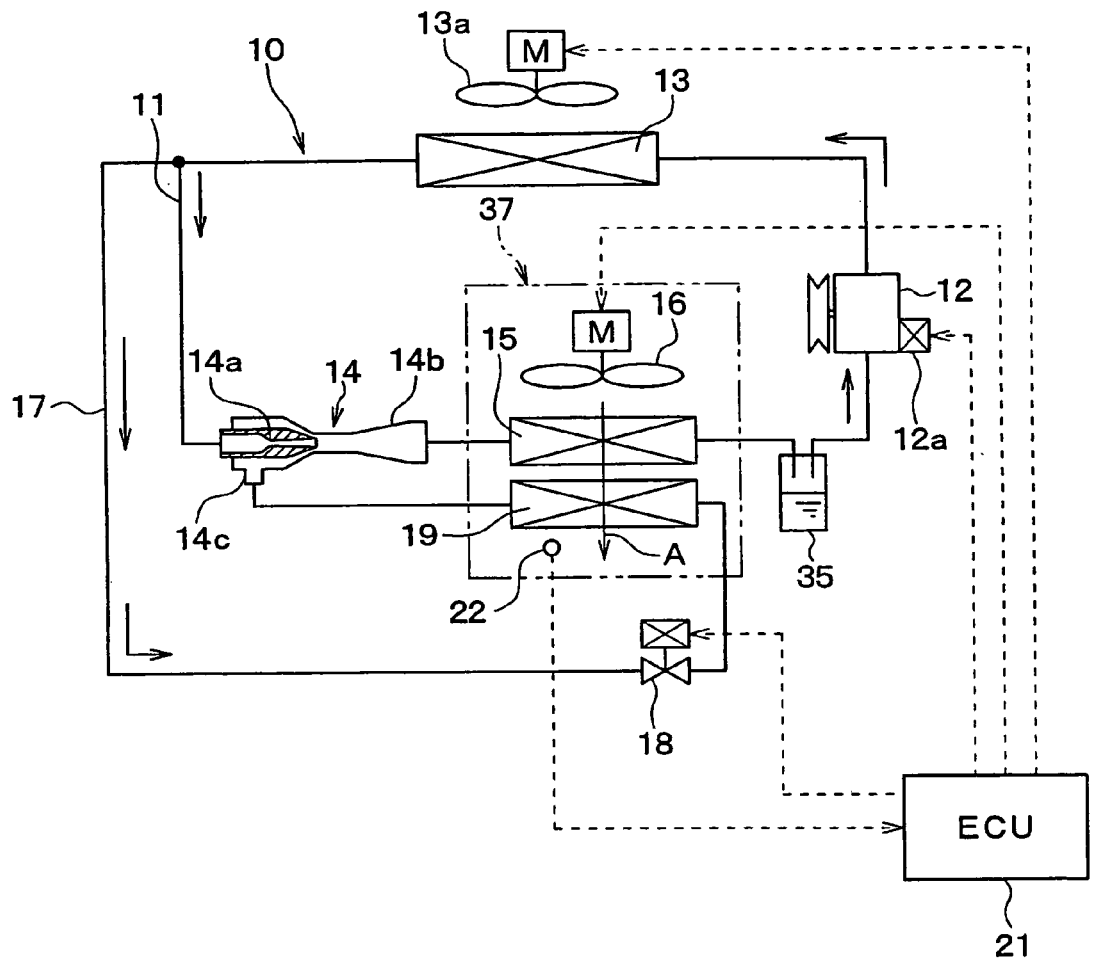
FIG. 15 is a cycle diagram illustrating an ejector-type refrigerant cycle device in a 14th embodiment.
FIG. 16 is a table summarizing the operations of various apparatuses in the 14th embodiment.

FIG. 15 illustrates a 14th embodiment, which is constructed by adding a vapor-liquid separator 35 to the first embodiment in FIG. 1. This vapor-liquid separator 35 is connected to the downstream side of the first evaporator 15, and separates the refrigerant at the outlet of the first evaporator 15 into vapor and liquid. The gas-liquid separator 35 stores the liquid phase refrigerant therein, and lets the vapor phase refrigerant out to the suction side of the compressor 12.

In the ejector-type refrigerant cycle device 10 in the 14th embodiment, the first evaporator 15 and the second evaporator 19 forms a refrigeration unit 37 for a refrigerator. The refrigeration unit 37 cools a common space to be cooled (specifically, the interior space of an in-vehicle refrigerator) to a low temperature of 0° C. or below.

More specific description will be given. The first evaporator 15 is disposed on the upstream side of the flow of air blown by an electric blower 16, and the second evaporator 19 is displaced on the downstream side of the first evaporator 15 with respect to the flow of the air. Thus, the cooling air that passed through the second evaporator 19 is blown out to the space to be cooled (refrigerator interior space). The first evaporator 15 and the second evaporator 19 may be integrally constructed by brazing or the like.

In the 14th embodiment, the common space to be cooled (refrigerator interior space) is cooled to a low temperature of 0° C. or below by the first evaporator 15 and the second evaporator 19. Therefore, defrosting operation must be performed both for the first evaporator 15 and for the second evaporator 19.

Description will be given to the operation of the 14th embodiment. FIG. 16 summarizes the operations of various apparatuses in the 14th embodiment. In the normal operation, the compressor 12, the electric cooling fan 13a for the radiator 13, and the electric blower 16 for the refrigeration unit 37 are brought into operating states. The throttling mechanism 18 provided with the fully opening function is controlled to a predetermined throttling state.

Thus, in the ejector-type refrigerant cycle device 10, the air blown by the electric blower 16 is cooled by the heat absorbing action due to the evaporation of refrigerant at the first evaporator 15 and the second evaporator 19. The space to be cooled by the refrigeration unit 37 can be thereby cooled. That is, regular refrigerating operation can be performed.

When the temperature detected by the temperature sensor 22 falls below a frost determination temperature, the control unit 21 determines that the first and second evaporators 15, 19 are frosted. In this case, the refrigerant cycle device 10 performs a defrosting operation mode. That is, the control unit 21 controls the throttling mechanism 18 provided with the fully opening function to brings it into a fully open state. At the same time, the compressor 12 and the electric blower 16 for the evaporators become in stopped states. The 14th embodiment uses as the compressor 12 a variable displacement compressor provided with an electromagnetic pressure controller 12a that constitutes a displacement control mechanism. Therefore, the stopped state of the compressor 12 is a state in which its discharge volume is reduced to its minimum volume close to 0% by the electromagnetic pressure controller 12a.

When the compressor 12 is a fixed displacement compressor provided with an electromagnetic clutch, the electromagnetic clutch can be disengaged to bring the compressor 12 into a stopped state, needless to add. During defrosting operation, the cooling fan 13a for the radiator may be in a stopped state or in an operating state.

In the defrosting operation, the throttling mechanism 18 is fully opened, and the high-temperature liquid refrigerant on the outlet side of the radiator 13 directly flows into the second evaporator 19. Further, the medium-temperature liquid refrigerant, which radiated heat at the second evaporator 19 and was lowered in temperature by a predetermined amount, passes through the refrigerant suction port 14c of the ejector 14 and flows into the first evaporator 15. Thus, the high-temperature liquid refrigerant on the outlet side of the radiator 13 flows from the second evaporator 19 to the first evaporator 15, and simultaneously defrosts the second evaporator 19 and the first evaporator 15.

In this embodiment, high-temperature liquid refrigerant on the radiator 13 side, which is present when the compressor 12 is in operation, is used to temporarily defrost the first and second evaporators 15, 19. For this reason, the compressor 12 is kept at a stop in the defrosting operation. That is, in cases where the first and second evaporators 15, 19 are small in size and the required cooling capability is low, the first and second evaporators 15, 19 can be defrosted by introducing the high-temperature liquid refrigerant on the radiator 13 side, which is present when the compressor 12 is in operation, into the first and second evaporators 15, 19.

Even if liquid refrigerant flows out of the outlet of the second evaporator 19 during defrosting operation, this liquid refrigerant can be stored in the vapor-liquid separator 35. Therefore, the liquid refrigerant can be prevented from returning to the compressor 12.

15th Embodiment

Figure 17:
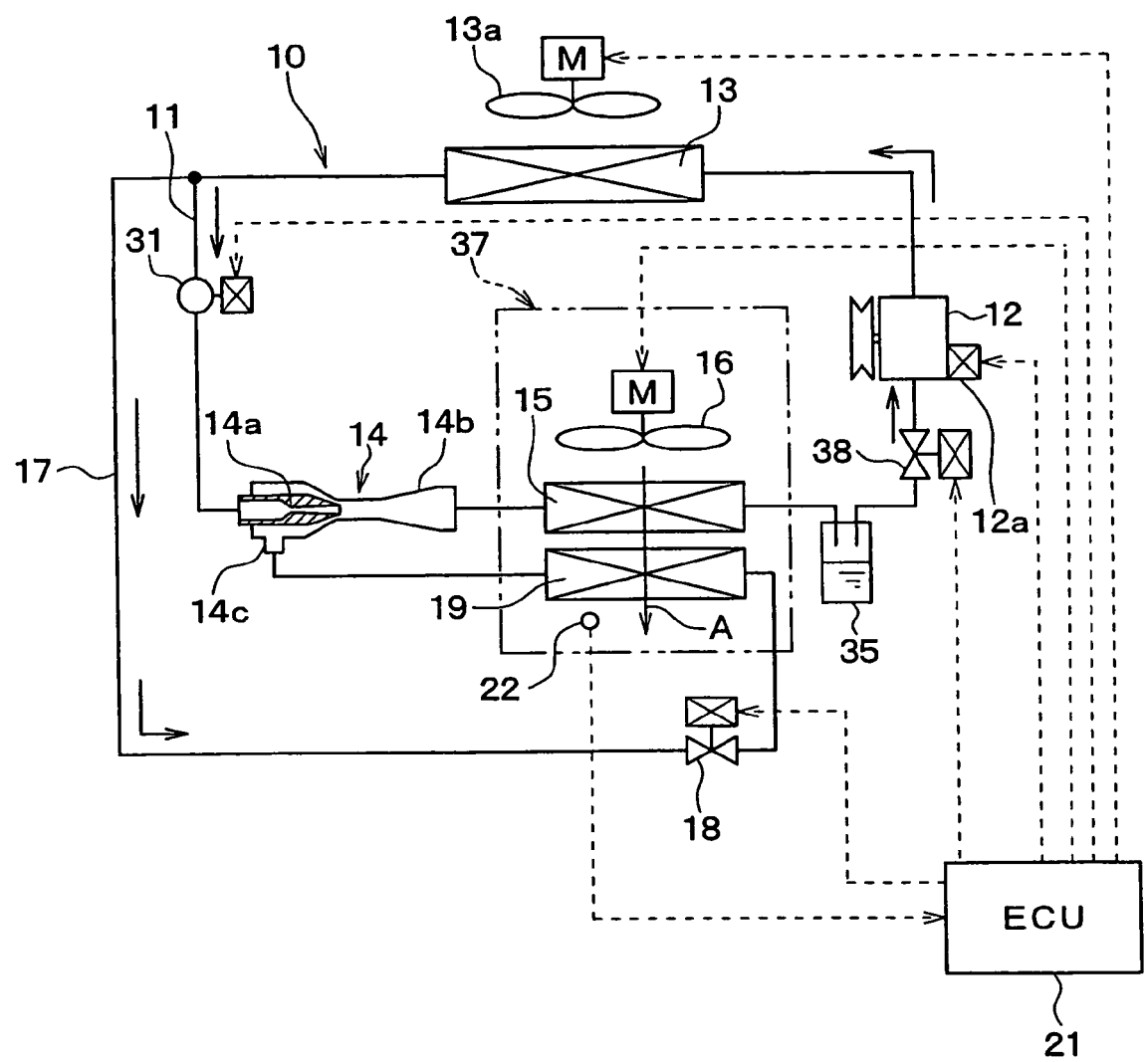
FIG. 17 is a cycle diagram illustrating an ejector-type refrigerant cycle device in a 15th embodiment.

FIG. 17 illustrates a 15th embodiment, which is constructed by adding a shut mechanism 31 located upstream of the ejector 14 and a throttling mechanism 38 located on the outlet side of the vapor-liquid separator 35 to the cycle structure of the 14th embodiment. The shut mechanism 31 may be the same as described with reference to FIG. 10 and the like.

The throttling mechanism 38 is provided with the function of fully opening the passage on the outlet side of the vapor-liquid separator 35 (i.e., the passage on the suction side of the compressor). The throttling mechanism 38 may be constructed identically with the throttling mechanism 18. However, the throttling mechanism 38 is controlled by the control unit 21 so that it is brought into a fully open state in the normal operation and is set to a predetermined throttle opening in the defrosting operation.

Figures 18, 19:
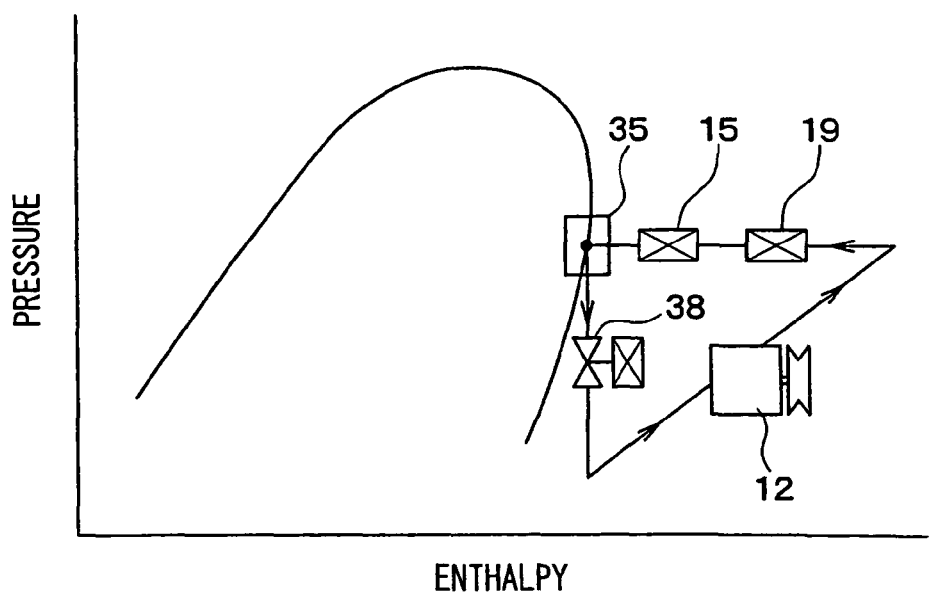
FIG. 18 is a table summarizing the operations of various apparatuses in the 15th embodiment.
FIG. 19 is a Mollier diagram illustrating the defrosting operation of the 15th embodiment.

Description will be given to the operation of the 15th embodiment. FIG. 18 summarizes the operations of various apparatuses in the 15th embodiment. In the normal operation, the compressor 12, the electric cooling fan 13a for the radiator 13, and the electric blower 16 for the refrigeration unit 37 are brought into an operating state. The throttling mechanism 18 provided with the fully opening function is controlled to a predetermined throttle opening, the throttling mechanism 38 provided with the fully opening function is controlled to a fully open state, and the shut mechanism 31 is controlled to a fully open state.

Thus, the low-pressure refrigerant that passed through the ejector 14 and was depressurized is evaporated at the first evaporator 15. At the same time, the low-pressure refrigerant that passed through the throttling mechanism 18 and was depressurized is evaporated at the second evaporator 19. Therefore, the air blown by the electric blower 16 is cooled by the cooling (heat absorbing) action of the first and second evaporators 15, 19, and thus the space to be cooled by the refrigeration unit 37 can be cooled. That is, regular refrigerating operation can be performed.

When the temperature detected by the temperature sensor 22 falls below a frost determination temperature, the control unit 21 controls various apparatuses as described below to perform defrosting operation.

While the compressor 12 is kept in an operating state, the cooling fan 13a for a radiator and the electric blower 16 for the evaporators are brought into a stopped state. At the same time, the throttling mechanism 18 is controlled to a fully open state, the throttling mechanism 38 is controlled to a predetermined throttle opening, and the shut mechanism 31 is controlled to a fully closed state.

When the cooling fan 13a for the radiator stops its operation, radiation of heat from refrigerant at the radiator 13 is substantially stopped. As a result, the refrigerant on the discharge side of the compressor 12 passes through the radiator 13 in vapor phase at high temperature and high pressure. Further, all of the high-pressure, high-temperature vapor phase refrigerant flows to the branch passage 17 since the shut mechanism 31 is fully closed. The high-pressure, high-temperature vapor phase refrigerant passes through the throttling mechanism 18 in a fully open state, and directly flows into the second evaporator 19.

The high-pressure, high-temperature vapor phase refrigerant radiates heat at the second evaporator 19 and is lowered in temperature by a predetermined amount. As a result, medium-temperature, high-pressure vapor phase refrigerant passes through the refrigerant suction port 14c of the ejector 14 and flows into the first evaporator 15. Thus, high-pressure, high-temperature vapor phase refrigerant flows from the second evaporator 19 to the first evaporator 15, and simultaneously defrosts the second evaporator 19 and the first evaporator 15.

The high-pressure refrigerant that flow out of the first evaporator 15 is separated into vapor and liquid in the vapor-liquid separator 35. The high-pressure vapor phase refrigerant that flows out of the vapor-liquid separator 35 is depressurized to a predetermined low pressure by the throttling mechanism 38, and is sucked as low-temperature, low-pressure vapor phase refrigerant into the compressor 12.

Even if high-pressure vapor phase refrigerant is condensed at the first evaporator 15 and the resulting refrigerant flows out of the outlet of the first evaporator 15 during defrosting operation, no problem arises. This liquid refrigerant can be stored in the vapor-liquid separator 35.

FIG. 19 is a Mollier diagram illustrating the cycle behavior of the 15th embodiment in the defrosting operation. The second evaporator 19 and the first evaporator 15 are defrosted in this order by the high-temperature, high-pressure vapor phase refrigerant on the discharge side of the compressor 12. Thereafter, the high-pressure vapor phase refrigerant is depressurized to a predetermined low pressure by the throttling mechanism 38 and is sucked into the compressor 12.

16th Embodiment

Figures 20, 21:
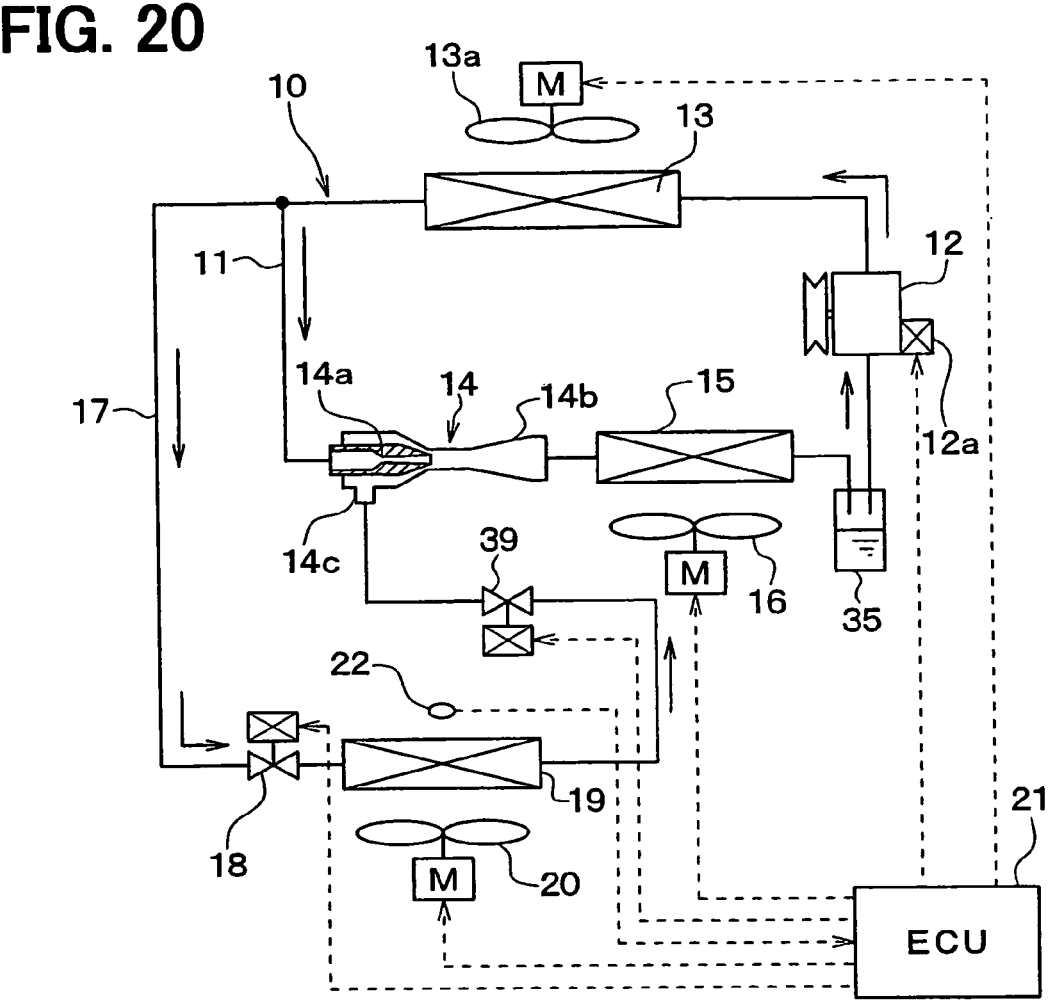
FIG. 20 is a cycle diagram illustrating an ejector-type refrigerant cycle device in a 16th embodiment.
FIG. 21 is a table summarizing the operations of various apparatuses in the 16th embodiment.

FIG. 20 illustrates the 16th embodiment, which is constructed such that a vapor-liquid separator 35 is added to the outlet side of the first evaporator 15 in the first embodiment illustrated in FIG. 1, and a throttling mechanism 39 provided with a fully opening function is added to the outlet side of the second evaporator 19. This throttling mechanism 39 may be of the same construction as the throttling mechanism 18. However, the throttling mechanism 39 is controlled by the control unit 21 so that it is brought into a fully open state in the normal operation and is set to a predetermined throttle opening in the defrosting and cooling operation.

The 16th embodiment is so constructed that the first evaporator 15 is provided for air conditioning in the interior of a vehicle compartment, and the second evaporator 19 is provided for cooling the interior of a refrigerator mounted in the vehicle. The first evaporator 15 and the second evaporator 19 respectively cool the air blown from the different electric blowers 16, 20.

Description will be given to the operation of the 16th embodiment. FIG. 21 summarizes various apparatuses in the 16th embodiment. In the normal operation, the compressor 12, the electric cooling fan 13a for the radiator 13, and the electric blowers 16, 20 are brought into an operating state. The throttling mechanism 18 on the inlet side of the second evaporator 19 is controlled to a predetermined throttle opening, and the throttling mechanism 39 on the outlet side of the second evaporator 19 is conversely controlled to a fully open state.

Thus, the low-pressure refrigerant that passed through the ejector 14 and was depressurized is evaporated at the first evaporator 15. As a result, the air blown by the electric blower 16 is cooled by the cooling (heat absorbing) action of the first evaporator 15, and the interior of the vehicle compartment is thereby cooled. At the same time, the low-pressure refrigerant that passed through the throttling mechanism 18 and was depressurized is evaporated at the second evaporator 19. As a result, the air blown by the electric blower 20 is cooled by the cooling (heat absorbing) capacity of the second evaporator 19, and the interior of the refrigerator is thereby cooled. With the above-described construction, the interior of the vehicle compartment and the interior of the refrigerator can be simultaneously cooled in the normal operation.

When the temperature detected by the temperature sensor 22 falls below a frost determination temperature, the control unit 21 controls various apparatuses as described below to carry out defrosting and cooling operation.

In the defrosting and cooling operation, while the compressor 12, the cooling fan 13a for a radiator, and the electric blower 16 for a first evaporator are kept in an operating state, the electric blower 20 for a second evaporator is brought into a stopped state. At the same time, the throttling mechanism 18 on the inlet side of the second evaporator 19 is controlled to a fully open state, and the throttling mechanism 39 on the outlet side of the second evaporator 19 is conversely controlled to a predetermined throttle opening.

Thus, the liquid-phase refrigerant on the outlet side of the radiator 13 flows into the second evaporator 19 at high temperature and high pressure to defrost the second evaporator 19. The high-pressure refrigerant radiates heat at the second evaporator 19, and becomes medium-temperature, high-pressure refrigerant. This high-pressure refrigerant passes through the second evaporator 19, and then depressurized by the throttling mechanism 39 and becomes low-temperature, low-pressure refrigerant in two phases (i.e., vapor phase and liquid phase).

This low-pressure refrigerant passes through the refrigerant suction port 14c of the ejector 14 and flows into the first evaporator 15. The suction-side, low-pressure refrigerant from the refrigerant suction port 14c and the low-pressure refrigerant that passed through the nozzle portion 14a of the ejector 14 join together and flow into the first evaporator 15. As a result, the cooling (heat absorbing) capacity of the first evaporator 15 can be obtained.

Figure 22:
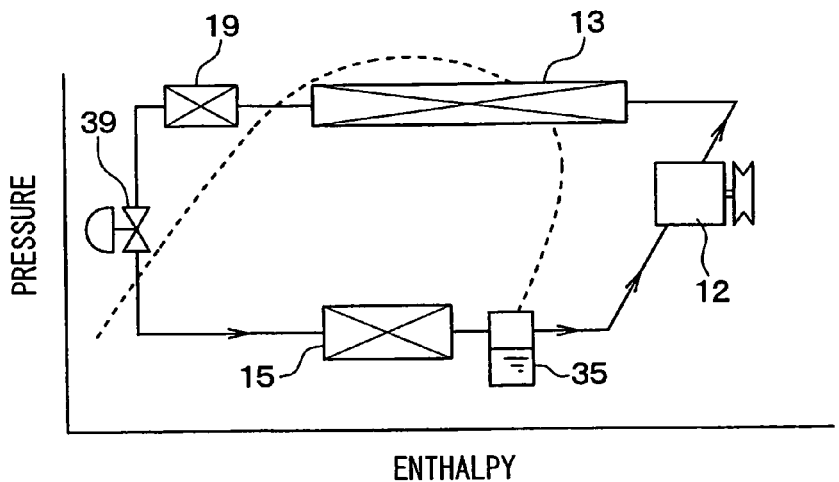
FIG. 22 is a Mollier diagram illustrating the defrosting and cooling operation of the 16th embodiment.

According to the 16th embodiment, therefore, the cooling operation can be performed at the first evaporator 15 at the same time as the operation of defrosting the second evaporator 19. FIG. 22 is a Mollier diagram illustrating the cycle behavior of the 16th embodiment in a defrosting and cooling operation mode.

17th Embodiment

Figure 26:
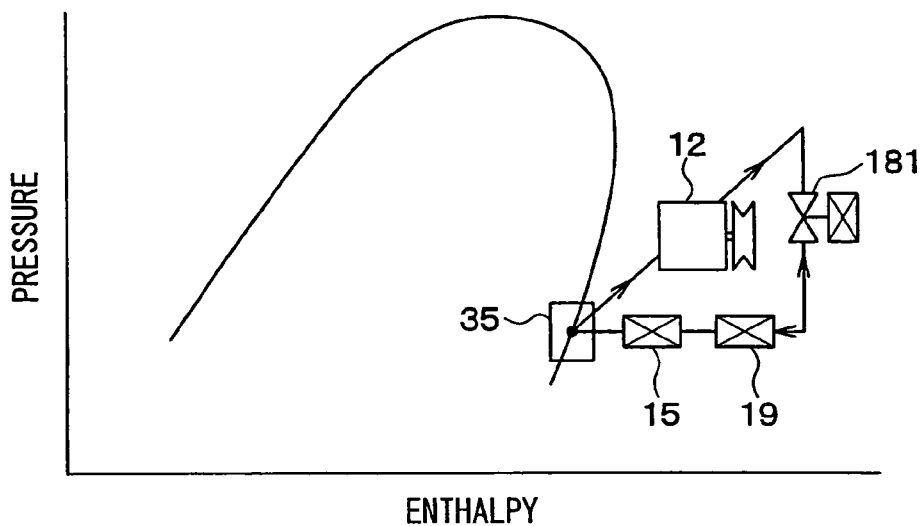
FIG. 26 is a Mollier diagram illustrating the defrosting operation of the 17th embodiment.

The 15th embodiment (FIG. 17) is so constructed that high-pressure, high-temperature refrigerant is used to defrost the first and second evaporators 15, 19, as illustrated in FIG. 19. The 17th embodiment (FIG. 23) is so constructed that low-pressure, high-temperature refrigerant is used to defrost the first and second evaporators 15, 19, as illustrated in FIG. 26.

Figures 24, 25:
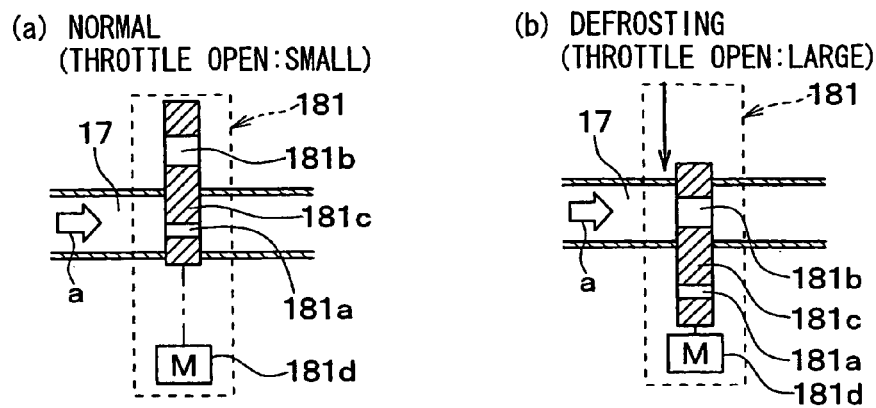
FIG. 25 is a table summarizing the operations of various apparatuses in the 17th embodiment.

In the 17th embodiment, consequently, a variable throttling mechanism 181 not provided with a fully opening function is provided at the inlet portion of the second evaporator 19. FIG. 24 shows a concrete example of this variable throttling mechanism 181. The variable throttling mechanism 181 has a first throttle hole 181a that is small in throttle opening, and a second throttle hole 181b that is larger in throttle opening than the first throttle hole 181a. The first throttle hole 181a and the second throttle hole 181b are formed in parallel in a movable plate member 181c.

This movable plate member 181c is so disposed that it is movable in the transversal direction of the branch passage 17 (the direction perpendicular to the direction "a" of the flow of refrigerant). The movable plate member 181c is driven by an electric actuator 181d constructed of a servo motor and the like.

In the normal operation, the movable plate member 181c is moved to the position illustrated in FIG. 24(a), where the first throttle hole 181a is positioned in the branch passage 17. In the defrosting operation, the movable plate member 181c is moved to the position illustrated in the FIG. 24(b) where the second throttle hole 181b is positioned in the branch passage 17.

Description will be given to the operation of the 17th embodiment. FIG. 25 summarizes the operations of various apparatuses in the 17th embodiment. In the normal operation, the compressor 12, the cooling fan 13a for the radiator, and the blower 16 for the evaporators are operated, and the shut mechanism 31 is brought into a fully open state.

In the variable throttle mechanism 181, the electric actuator 181d is controlled by the ECU 21. The movable plate member 181c is thereby moved to the position illustrated in FIG. 24(a) so that the first throttle hole 181a is positioned in the branch passage 17.

In the normal operation, as a result, the small throttle opening state is set by the first throttle hole 181a. The low-pressure refrigerant depressurized through the first throttle hole 181a flows into the second evaporator 19, and the cooling (heat absorbing) capacity of the second evaporator 19 is obtained.

The high-pressure refrigerant flows into the ejector 14 through the shut mechanism 31 in a fully open state, and is depressurized through the nozzle portion 14a. The low-pressure refrigerant depressurized through the nozzle portion 14a and the low-pressure refrigerant that passed through the second evaporator 19 and was sucked into the refrigerant suction port 14c flow together into the first evaporator 15. The cooling (heat absorbing) action of the first evaporator 15 is thereby exerted.

With the above-described construction, the air blown by the electric blower 16 can be cooled by a combination of the cooling (heat absorbing) action of the first and second evaporators 15, 19, and the space to be cooled by the cooling unit 37 can be thereby cooled. That is, regular cooling operation is performed.

When the temperature detected by the temperature sensor 22 falls below a frost determination temperature, the control unit 21 controls various apparatuses as described below to carry out defrosting operation.

In the defrosting operation, the compressor 12 is kept in an operating state, the cooling fan 13a for the radiator and the blower 16 for the evaporators are stopped, and the shut mechanism 31 is brought into a fully closed state. In the variable throttling mechanism 181, the electric actuator 181d is controlled by the ECU 21. The movable plate member 181c is thereby moved to the position illustrated in FIG. 24(b) so that the second throttle hole 181b is positioned in the branch passage 17. Thus, the large throttle opening state is set by the second throttle hole 181b.

In the defrosting operation, the radiator cooling fan 13a is stopped, and thus radiation of heat from refrigerant at the radiator 13 is substantially stopped. As a result, the refrigerant on the discharge side of the compressor 12 passes through the radiator 13 as is in vapor phase at high temperature and high pressure. Then, this refrigerant from the radiator 13 flows toward the inlet side of the variable throttling mechanism 181. Since the shut mechanism 31 is brought into a fully closed state in the defrosting operation, all of the vapor phase refrigerant on the discharge side of the compressor 12 flows into the variable throttling mechanism 181.

In the variable throttling mechanism 181, depressurizing action is exerted by the second throttle hole 181b that is larger in throttle opening than the first throttle hole 181a. The high-temperature, high-pressure vapor phase refrigerant is turned into low-pressure, high-temperature vapor phase refrigerant by this depressurizing action of the second throttle hole 18b. The low-pressure, high-temperature vapor phase refrigerant flows into the second evaporator 19 first to defrost the second evaporator 19.

The low-pressure, high-temperature vapor phase refrigerant passes through the second evaporator 19 and the ejector 14, and then flows into the first evaporator 15 to defrost the first evaporator 15. The refrigerant that passed through the first evaporator 15 is separated into vapor and liquid in the vapor-liquid separator 35. The vapor phase refrigerant in the vapor-liquid separator 35 is sucked into the compressor 12 and compressed again.

FIG. 26 is a Mollier diagram illustrating the cycle behavior of the 17th embodiment in the defrosting operation. In the 17th embodiment, the shut mechanism 31 is fully closed, and all of the high-temperature, high-pressure vapor phase refrigerant is thereby depressurized at the variable throttling mechanism 181. Thereafter, the refrigerant flows into the second evaporator 19. The refrigerant that passed through the second evaporator 19 is caused to flow into the first evaporator 15. Thus, the second evaporator 19 and the first evaporator 15 can be effectively defrosted using low-pressure, high-temperature refrigerant.

The variable throttling mechanism 181 reduces the pressure of the liquid phase refrigerant, condensed at the radiator 13, in the normal operation. The variable throttle mechanism 181 reduces the pressure of vapor phase refrigerant on the discharge side of the compressor 12 in the defrosting operation. Vapor phase refrigerant is significantly lower in density than liquid phase refrigerant. Therefore, the throttle opening of the variable throttling mechanism 181 is made larger in the defrosting operation than in the normal operation so as to ensure the flow rate of refrigerant circulating in the cycle in the defrosting operation.

For the shut mechanism 31, the 17th embodiment uses a mechanism of an on-off valve type that is fully opened and fully closed. Instead, a valve operating mechanism of a flow control type capable of continuously adjusting the area of the passage may be used for the shut mechanism 31. Thus, high-temperature vapor phase refrigerant is caused to flow into the ejector 14 at a predetermined flow rate in the defrosting operation. The rate of flow of refrigerant to the ejector 14 may be regulated by a shut mechanism 31 of a flow control type in the normal operation. The shut mechanism 31 may be constructed as a valve operating mechanism of a flow control type, similarly to shut mechanisms in other embodiments.

18th Embodiment

Figure 27:
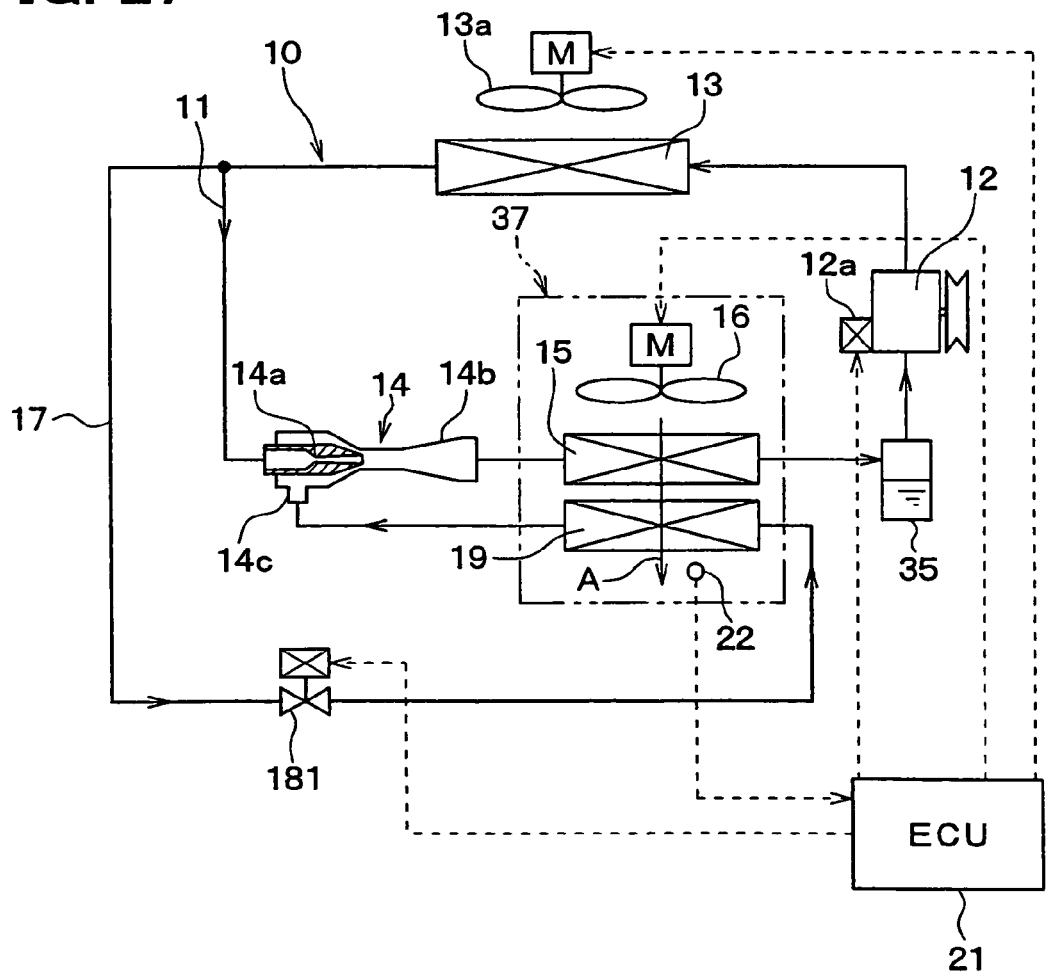
FIG. 27 is a cycle diagram illustrating an ejector-type refrigerant cycle device in an 18th embodiment.

FIG. 27 illustrates an 18th embodiment, in which the shut mechanism 31 in the 17th embodiment (FIG. 23) is removed and the upstream portion of the ejector 14 is directly connected to the outlet portion of the radiator 13. The other parts of the 18th embodiment are the same as those of the 17th embodiment. In the 18th embodiment, therefore, the opening/closing of the shut mechanism 31 is only eliminated from the cycle structure in FIG. 25. The other apparatuses are switched between the normal operation and the defrosting operation as illustrated in FIG. 25.

In the defrosting operation of the 18th embodiment, among the high-temperature, high-pressure vapor phase refrigerant that passed through the radiator 13, a predetermined percentage of high-temperature vapor phase refrigerant is depressurized by the variable throttling mechanism 181. It is thereby brought into vapor phase at low pressure and high temperature, and this low-pressure, high-temperature vapor phase refrigerant flows into the second evaporator 19 to defrost the second evaporator 19.

At the same time, the remnant of the high-temperature, high-pressure vapor phase refrigerant that passed through the radiator 13 flows into the ejector 14 and is depressurized there. Therefore, refrigerant from the radiator 13 becomes into low-pressure, high-temperature vapor phase refrigerant. This low-pressure, high-temperature vapor phase refrigerant and the low-pressure vapor phase refrigerant that passed through the second evaporator 19 join together in the ejector 14. The low-pressure, high-temperature vapor phase refrigerant from the ejector 14 flows into the first evaporator 15 to defrost the first evaporator 15.

In the 18th embodiment, the low-pressure, high-temperature vapor phase refrigerant that passed through the ejector 14 and was depressurized directly flows into the first evaporator 15. Therefore, the temperature (amount of heat) of the vapor phase refrigerant that flows into the first evaporator 15 can be increased to enhance the capability for defrosting the first evaporator 15, as compared with the 17th embodiment.

19th Embodiment

Figure 23:
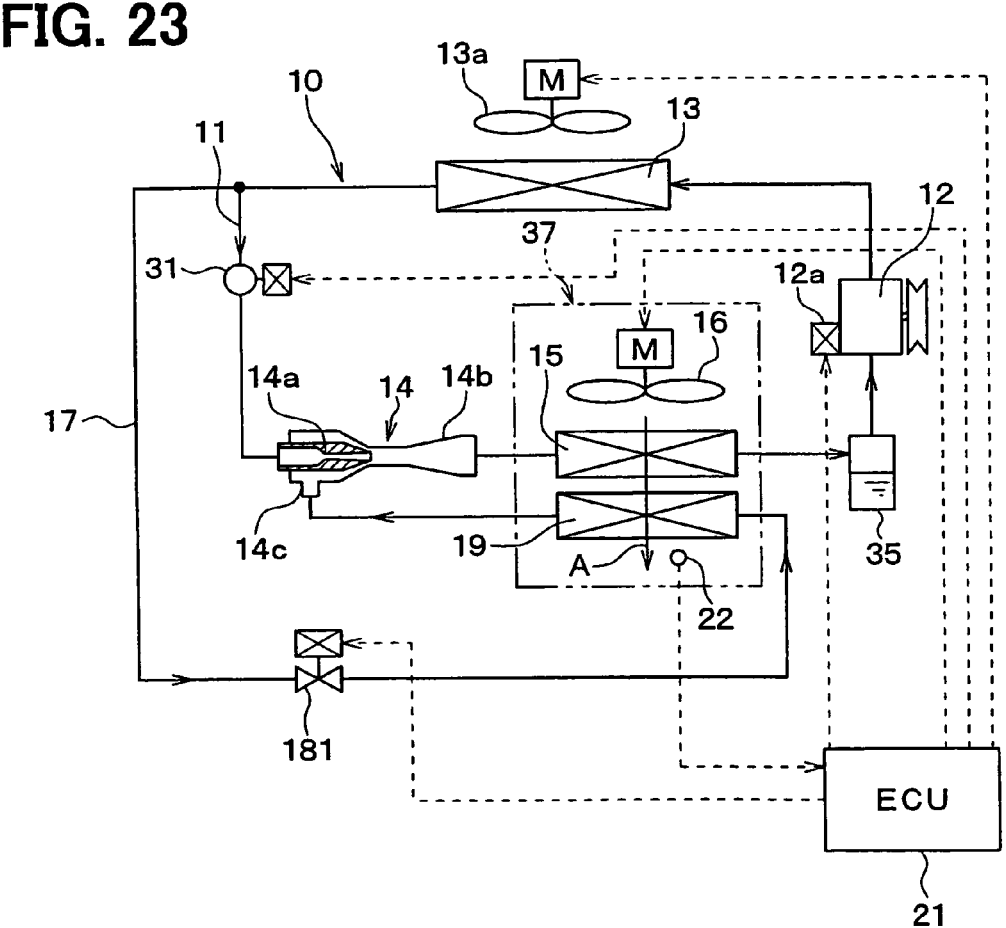
FIG. 23 is a cycle diagram illustrating an ejector-type refrigerant cycle device in a 17th embodiment.
Figure 28:
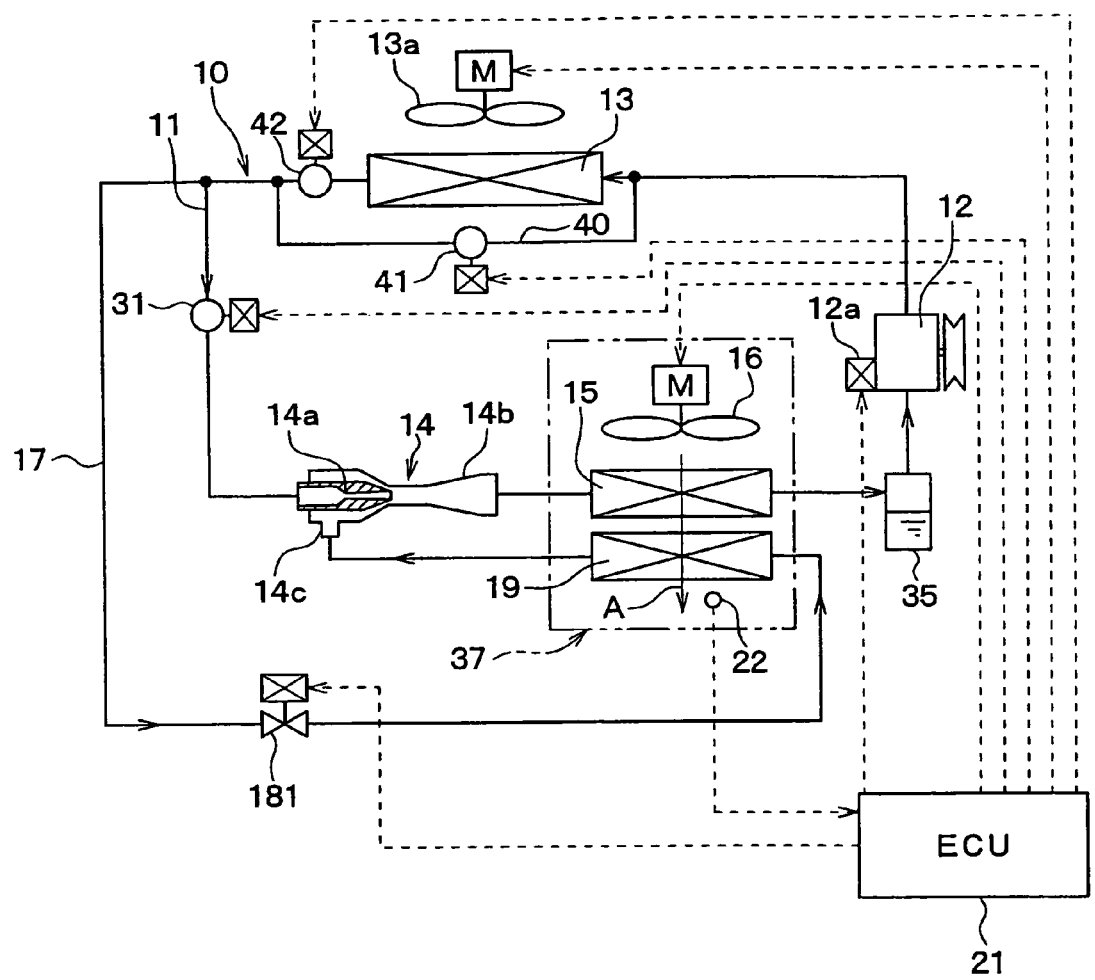
FIG. 28 is a cycle diagram illustrating an ejector-type refrigerant cycle device in a 19th embodiment.

FIG. 28 illustrates a 19th embodiment, which is constructed by adding: a bypass passage 40 that bypasses the radiator 13; a shut mechanism 41 placed in the bypass passage 40; and a shut mechanism 42 placed at the outlet portion of the radiator 13, to the cycle structure of the 17th embodiment (FIG. 23). The shut mechanism 41 and the shut mechanism 42 are disposed in parallel with each other.

FIG. 29 illustrates the various apparatuses which are switched between normal operation and defrosting operation in the 19th embodiment. In the normal operation of the 19th embodiment, the shut mechanism 31 and the shut mechanism 42 are brought into a fully open state, and the shut mechanism 41 is brought into a fully closed state to shut off the bypass passage 40. Thus, normal operation is performed in the same manner as in the 17th embodiment.

In the defrosting operation, the shut mechanism 31 and the shut mechanism 42 are brought into a fully closed state, and the shut mechanism 41 is brought into a fully open state to open up the bypass passage 40. The high-pressure, high-temperature vapor phase refrigerant discharged from the compressor 12 flows through the bypass passage 40, while bypassing the radiator 13.

All of the discharged vapor phase refrigerant at high pressure and high temperature that bypasses the radiator 13 is depressurized by the variable throttling mechanism 181, and is turned into low-pressure, high-temperature vapor phase refrigerant. This low-pressure, high-temperature vapor phase refrigerant flows from the second evaporator 19 to the first evaporator 15 through the ejector 14 so as to defrost the second evaporator 19 and the first evaporator 15.

In the defrosting operation of the 19th embodiment, the radiator cooling fan 13a is kept in an operating state while the shut mechanism 42 at the outlet portion of the radiator 13 is fully closed. Therefore, a part of the vapor phase refrigerant discharged from the compressor 12 can be cooled by outside air and condensed in the radiator 13, and thereby liquid phase refrigerant can be stored in the radiator 13. Accordingly, the quantity of liquid phase refrigerant stored in the vapor-liquid separator 35 during defrosting operation can be reduced, and therefore, the capacity of the tank of the vapor-liquid separator 35 can be reduced.

20th Embodiment

Figure 30:
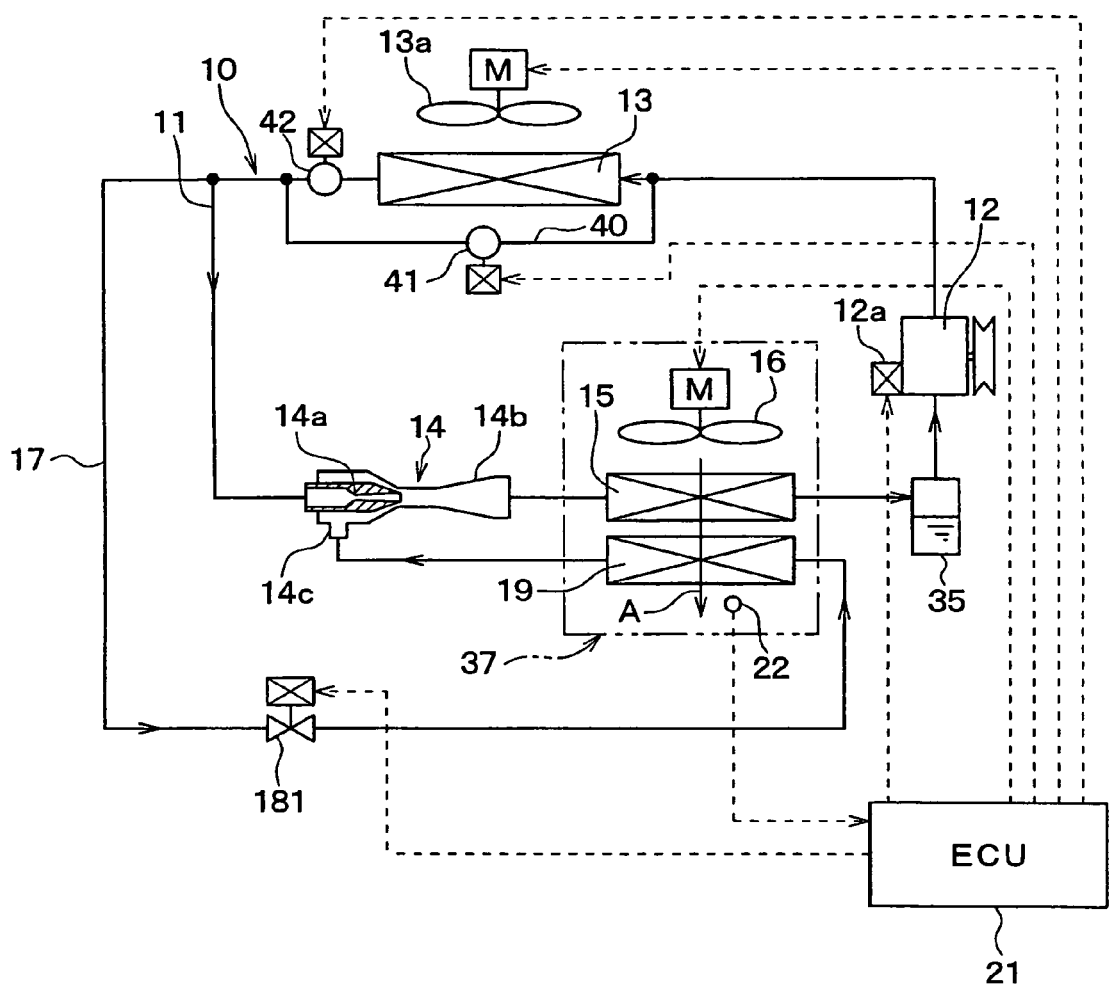
FIG. 30 is a cycle diagram illustrating an ejector-type refrigerant cycle device in a 20th embodiment.

FIG. 30 illustrates the 20th embodiment, which is constructed by removing the shut mechanism 31 from the 19th embodiment (FIG. 28). Therefore, the cycle configuration of the 20th embodiment is the same as that of the 18th embodiment (FIG. 27) in that the shut mechanism 31 is removed. For this reason, the 20th embodiment can produce the action and effect that would be produced by a combination of the 18th embodiment and the 19th embodiment.

21st Embodiment

Figure 31:
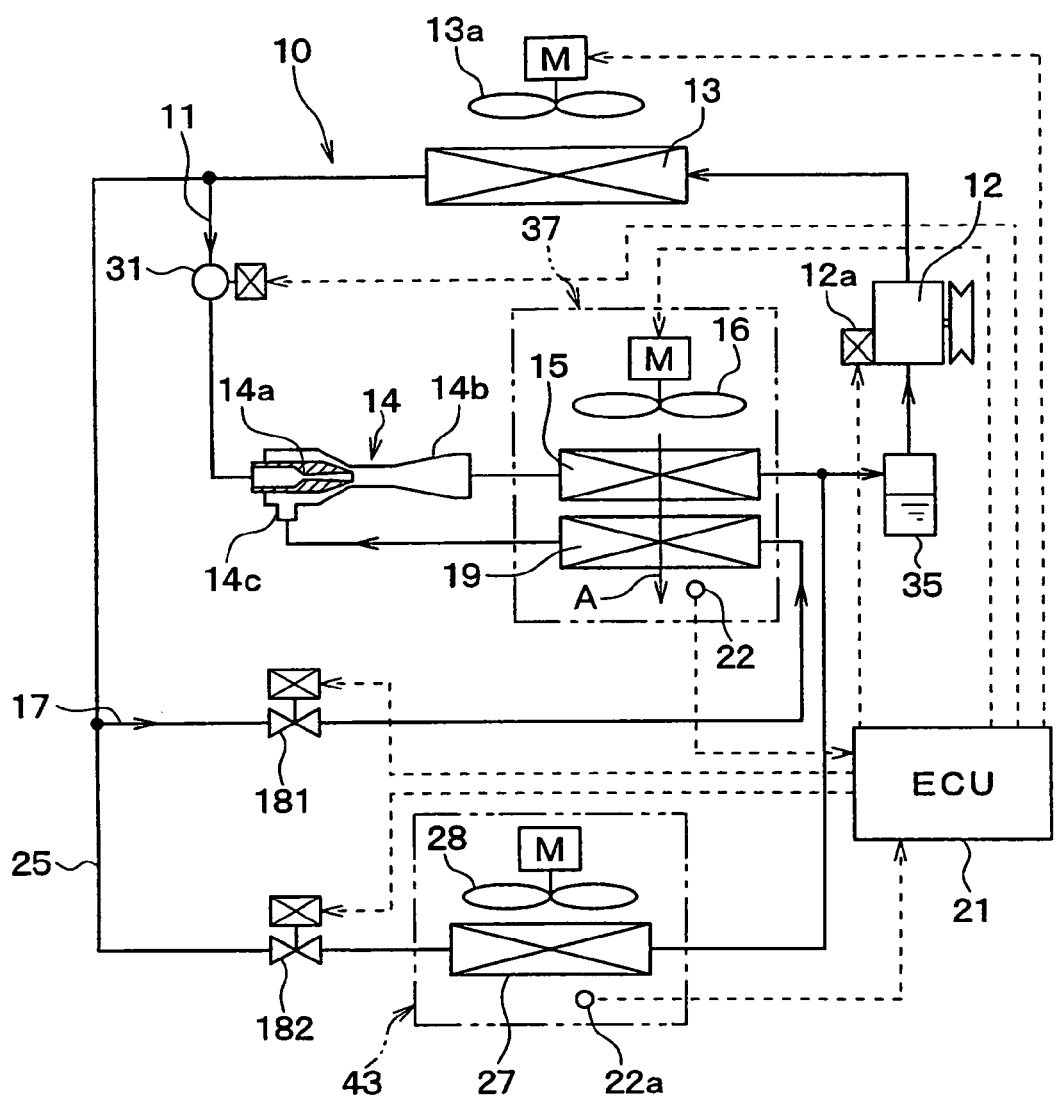
FIG. 31 is a cycle diagram illustrating an ejector-type refrigerant cycle device in a 21st embodiment.

FIG. 31 illustrates the 21st embodiment, which has a cycle configuration in which three or more evaporators are combined. The 21st embodiment is based on the cycle configuration of the 17th embodiment (FIG. 23), and has a second branch passage 25 added thereto. This second branch passage 25 is similar to that in the third embodiment (FIG. 4). The second branch passage 25 is branched from the first branch passage 17 upstream of the variable throttling mechanism 181, and is connected to the outlet side of the first evaporator 15.

A variable throttling mechanism 182 is provided in the second branch passage 25 on the upstream side, and a third evaporator 27 is provided downstream of the throttling mechanism 182. Like the variable throttling mechanism 181 illustrated in FIG. 24, the variable throttling mechanism 182 is constructed such that a first throttle hole, small in throttle opening, and a second throttle hole, larger in throttle opening than the first throttle hole, are formed in parallel in a movable plate member.

Thus, the variable throttling mechanism 182 is so constructed that: in the normal operation, the small throttle opening state is set by the first throttle hole; and in the defrosting operation, the large throttle opening state is set by the second throttle hole.

The third evaporator 27, together with an electric blower 28, constitutes an independent refrigeration unit 43. The 21st embodiment is so constructed that: the interior space (space to be cooled) in a first refrigerator is cooled to a low temperature of 0° C. or below by the first refrigeration unit 37; and the interior space (space to be cooled) in a second refrigerator is cooled to a low temperature of 0° C. or below by the second refrigeration unit 43.

The outlet side of the third evaporator 27 is connected to the outlet side of the first evaporator 15. Therefore, the refrigerant evaporating pressure (refrigerant evaporating temperature) of the third evaporator 27 is made equal to that of the first evaporator 15. Consequently, the cooling temperature of the second refrigeration unit 43 is higher than the cooling temperature of the first refrigeration unit 37.

The second refrigeration unit 43 is so constructed as to cool the air, blown by the electric blower 28 by the third evaporator 27, and blow the cooling air into the space to be cooled. Since the cooling temperature of the second refrigeration unit 43 is also as low as 0° C. or below, it is required to defrost the third evaporator 27 as well.

A temperature sensor 22a is installed in proximity to the third evaporator 27. The temperature of the area in proximity to the third evaporator 27 is detected with the temperature sensor 22a, and its detection signal is inputted to the ECU 21. The ECU 21 issues a defrosting operation command based on the detected temperatures from the temperature sensor 22 for the first refrigeration unit 37 and the temperature sensor 22a for the second refrigeration unit 43.

FIG. 32 illustrates the various apparatuses which are switched between normal operation and defrosting operation in the 21st embodiment. In the defrosting operation, vapor phase refrigerant on the discharge side of the compressor 12 passes through the radiator 13 in a high-temperature, high-pressure state. It is depressurized by the variable throttling mechanisms 181, 182 and turned into low-pressure, high-temperature vapor phase refrigerant. The low-pressure, high-temperature vapor phase refrigerant in the first branch passage 17 flows from the second evaporator 19 to the first evaporator 15 to defrost both the evaporators 19, 15. At the same time, the low-pressure, high-temperature vapor phase refrigerant in the second branch passage 25 flows into the third evaporator 27 to defrost the third evaporator 27.

In the 21st embodiment, a shut mechanism 31 is provided upstream of the ejector 14, and this shut mechanism 31 is fully closed in the defrosting operation. Instead, this shut mechanism 31 may be removed. That is, the 21st embodiment may be constructed by combining the second branch passage 25, including the variable throttling mechanism 182 and the third evaporator 27, with the cycle configuration of the 18th embodiment (FIG. 27).

22nd Embodiment

Figure 33:
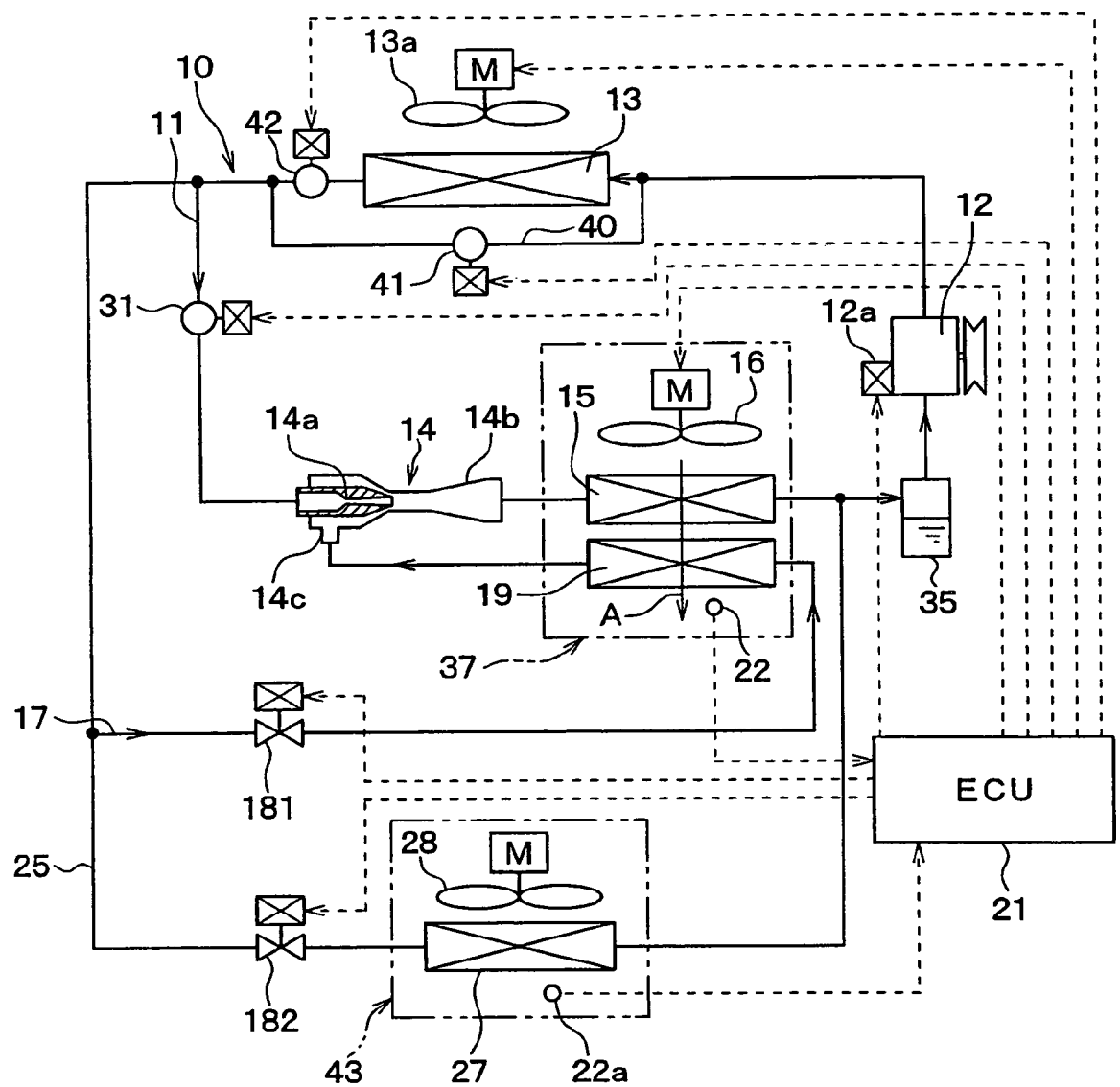
FIG. 33 is a cycle diagram illustrating an ejector-type refrigerant cycle device in a 22nd embodiment.

FIG. 33 illustrates the 22nd embodiment, which is constructed by combining a second branch passage 25, including a variable throttling mechanism 182 and a third evaporator 27, with the cycle configuration of the 19th embodiment (FIG. 28).

In the example illustrated in FIG. 33, a shut mechanism 31 is provided upstream of the ejector 14, and the shut mechanism 31 is fully closed in the defrosting operation. This shut mechanism 31 may be removed as in the 20th embodiment (FIG. 30).

23rd Embodiment

Figure 34:
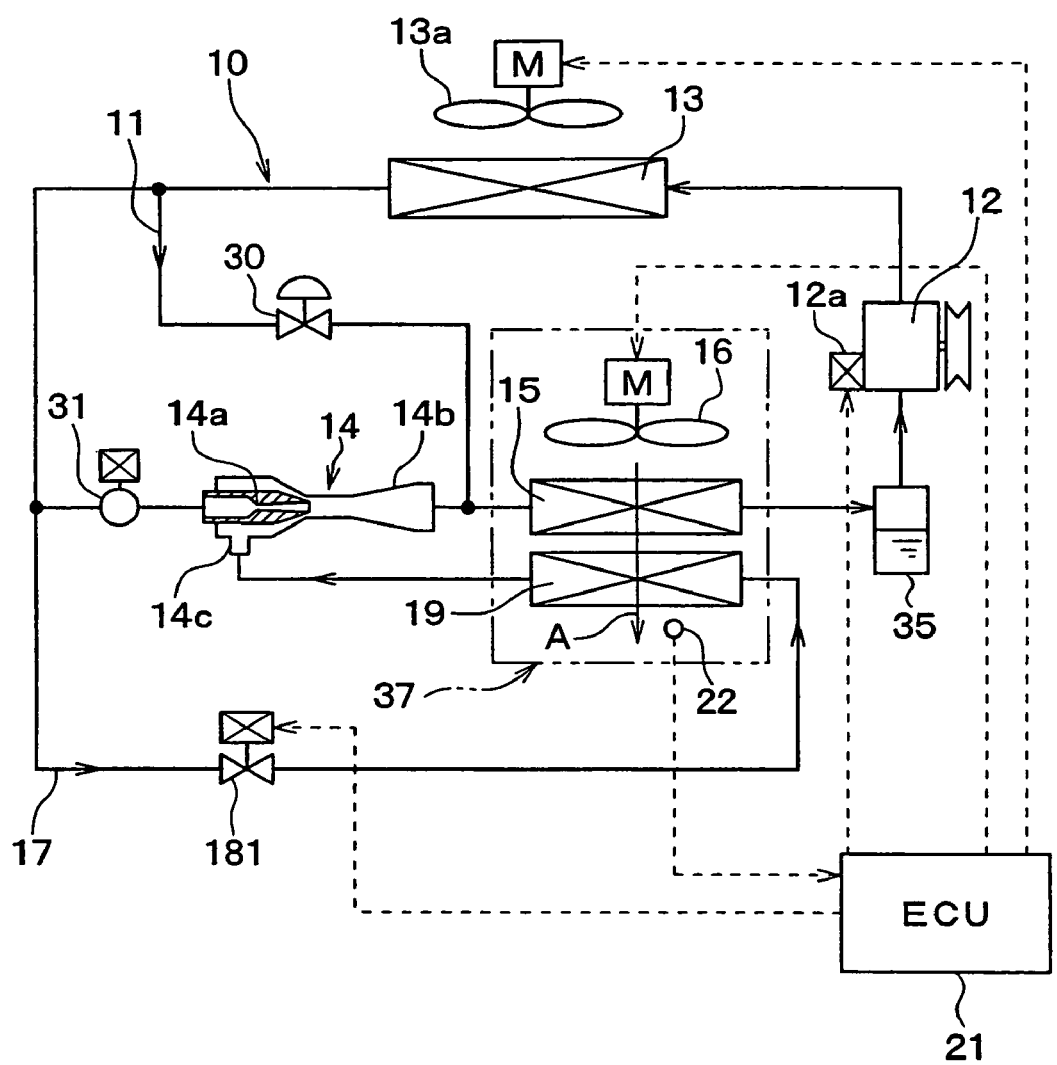
FIG. 34 is a cycle diagram illustrating an ejector-type refrigerant cycle device in a 23rd embodiment.

FIG. 34 illustrates the 23rd embodiment. This embodiment adopts a cycle configuration in which a dedicated throttling mechanism 30 is added to the upstream portion of the first evaporator 15 and the ejector 14 is disposed in parallel with the throttling mechanism 30 as in the fifth embodiment (FIG. 6). In the 23rd embodiment, the refrigeration unit 37, the shut mechanism 31, and the variable throttling mechanism 181 in the 17th embodiment (FIG. 23) are combined with the above-described cycle configuration in which an ejector is disposed in parallel with the throttling mechanism 30.

The various apparatuses are switched between the normal operation and the defrosting operation in the 23rd embodiment as in the 17th embodiment. The operations of the apparatuses can be switched as illustrated in FIG. 25.

In the example illustrated in FIG. 34, the shut mechanism 31 is provided upstream of the ejector 14, and the shut mechanism 31 is fully closed in the defrosting operation. Instead, this shut mechanism 31 may be removed.

24th Embodiment

Figure 35:
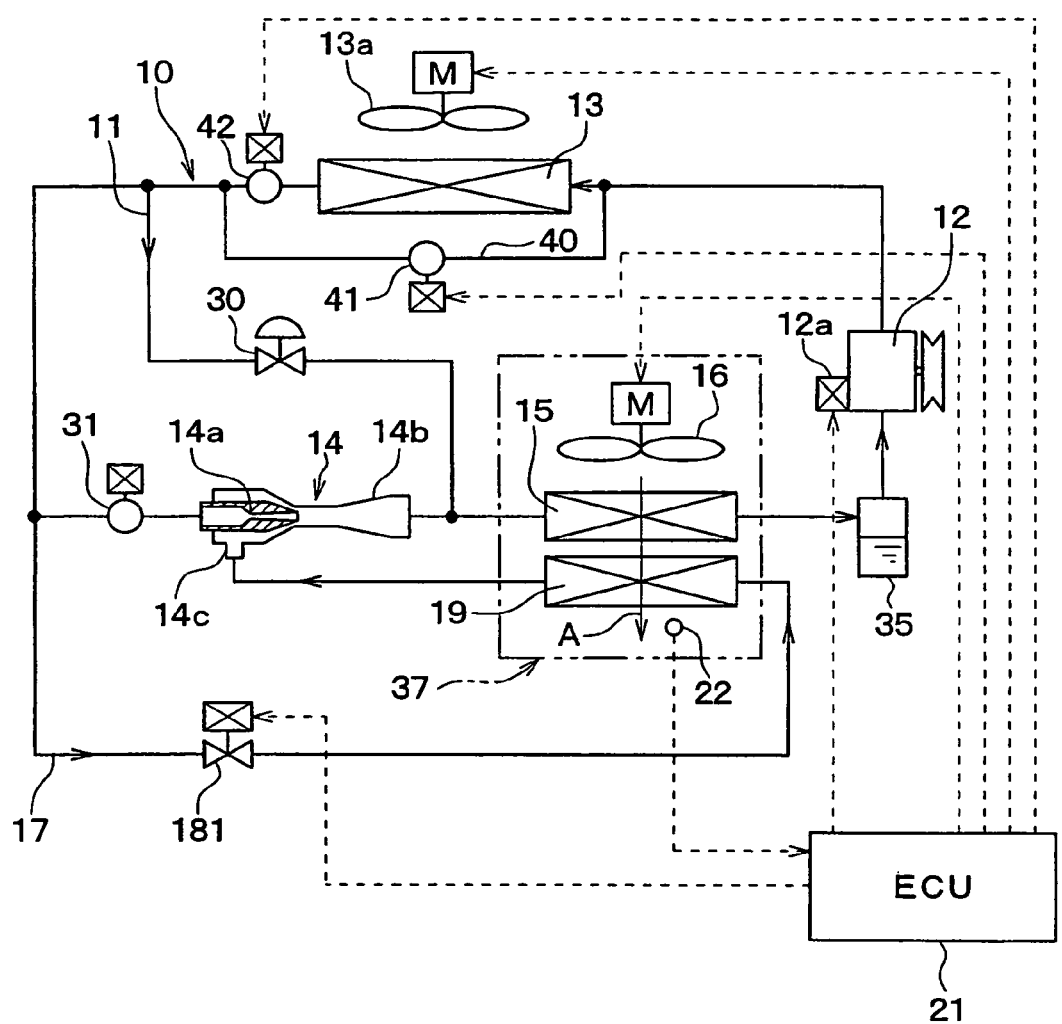
FIG. 35 is a cycle diagram illustrating an ejector-type refrigerant cycle device in a 24th embodiment.

FIG. 35 illustrates the 24th embodiment, which is constructed by adopting a cycle configuration in which an ejector is disposed in parallel with the throttling mechanism 30 in the cycle structure of the 19th embodiment (FIG. 28). The various apparatuses are switched between normal operation and defrosting operation in the 24th embodiment, similarly to that in the 19th embodiment. The operations of the apparatuses can be switched as illustrated in FIG. 29.

Also in the 24th embodiment, the shut mechanism 31 on the upstream side of the ejector 14 may be removed.

25th Embodiment

Figure 36:
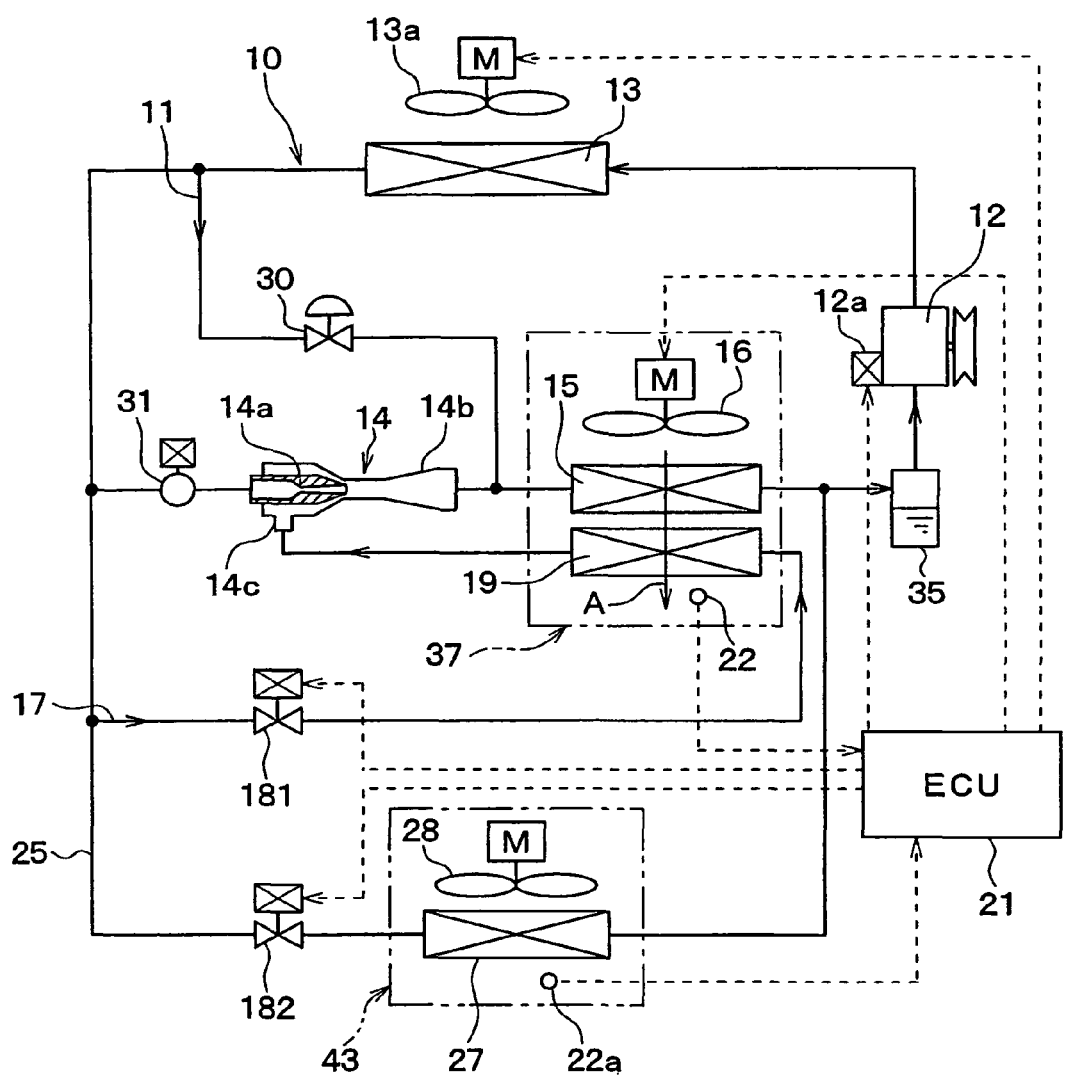
FIG. 36 is a cycle diagram illustrating an ejector-type refrigerant cycle device in a 25th embodiment.

FIG. 36 illustrates the 25th embodiment, which is constructed by adopting a cycle configuration in which an ejector is disposed in parallel with the throttle mechanism 30, in the cycle structure of the 21st embodiment (FIG. 31). Also in the 25th embodiment, the shut mechanism 31 on the upstream side of the ejector 14 may be removed.

26th Embodiment

Figure 37:
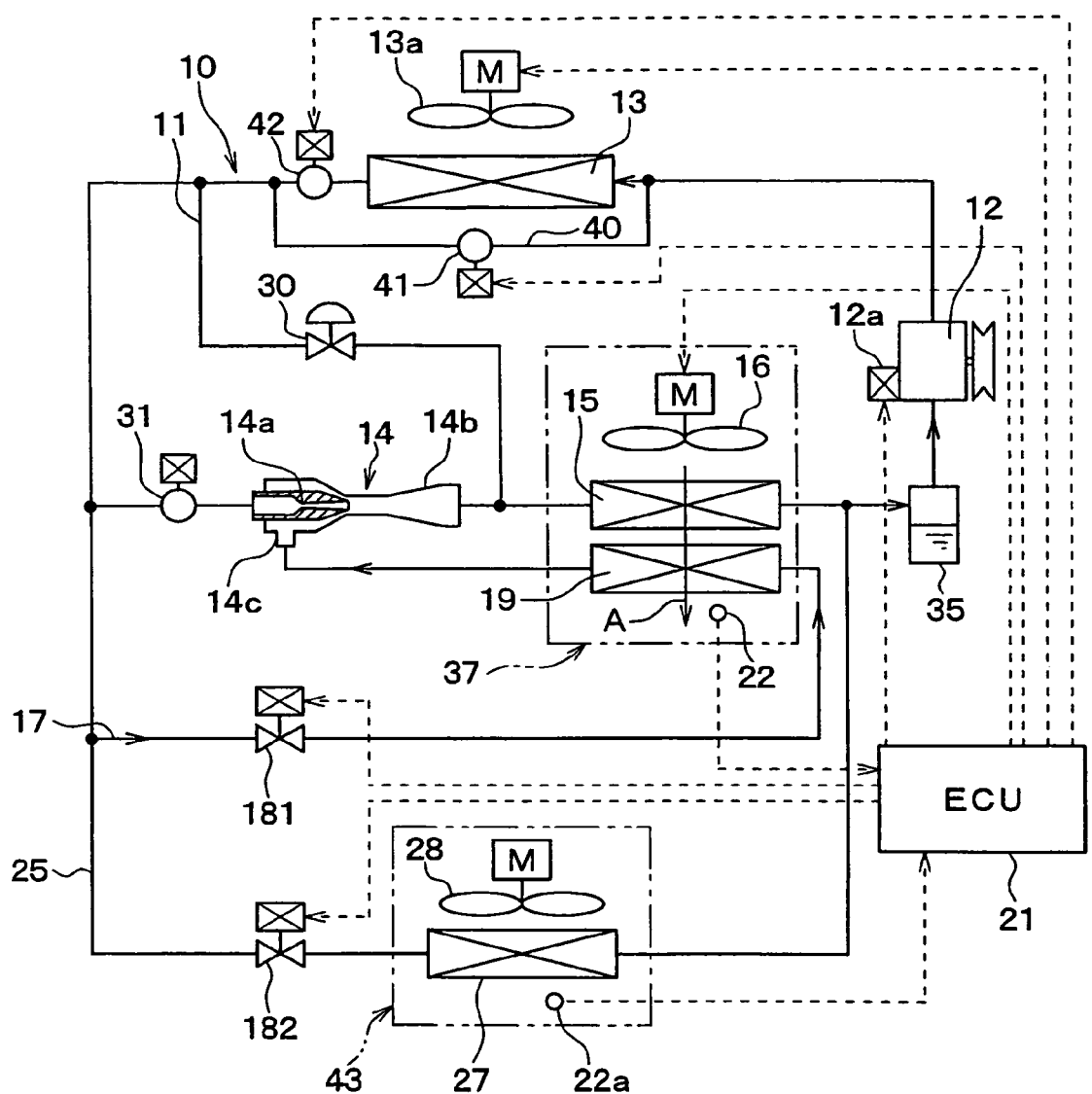
FIG. 37 is a cycle diagram illustrating an ejector-type refrigerant cycle device in a 26th embodiment.

FIG. 37 illustrates the 26th embodiment, which is constructed by adopting a cycle configuration in which an ejector is disposed in parallel with the throttle mechanism 30, in the cycle structure of the 22nd embodiment (FIG. 33). Also in the 26th embodiment, the shut mechanism 31 on the upstream side of the ejector 14 may be removed.

Other Embodiments

The present invention is not limited to the above-described embodiments, and various modifications can be mad thereto, as described below.

(1) In the above-described embodiments, the temperature of air in proximity to the second evaporator 19 or the third evaporator 27 is detected by using the temperature sensor 22, 22a, and defrosting operation is automatically performed. This is just an example. Various modifications can be made to automatic control on defrosting operation. Some examples will be taken. Instead of the temperature of air in proximity to the second or third evaporator 19, 27, the surface temperature of the second or third evaporator 19, 27 may be detected by using the temperature sensor 22, 22a to automatically control defrosting operation.

A refrigerant temperature sensor for detecting the temperature of refrigerant may be provided in a refrigerant passage in proximity to the second or third evaporator 19, 27. Thus, defrosting operation is automatically controlled based on the temperature of refrigerant in proximity to the second or third evaporator 19, 27.

There is correlation between the temperature of refrigerant in proximity to the second and third evaporators 19, 27 and the pressure of the refrigerant. Therefore, a refrigerant pressure sensor for detecting the pressure of refrigerant in proximity to the second or third evaporator 19, 27 may be provided. Thus, defrosting operation is automatically controlled based on the pressure of refrigerant in proximity to the second or third evaporator 19, 27.

The temperature sensors 22, 22a and refrigerant pressure sensors as mentioned above may be removed. Instead, defrosting operation may be automatically performed only for a predetermined time at predetermined time intervals according to the timer function of the ECU 21 after the cycle is started.

(2) As the throttling mechanism 18 provided with the fully opening function, FIG. 2 shows one which is so constructed that: the movable plate member 18c has the throttle hole 18a constituting a fixed throttle and the fully opening hole 18b for fully opening the branch passage 17 formed therein; and the movable plate member 18c is driven by the electric actuator 18d. Alternatively, an electric expansion valve, in which valve element opening is continuously varied by an electric actuator, such as a servo motor, may be used for the throttling mechanism 18 provided with the fully opening function. Thus, the electric expansion valve is fully opened in the defrosting of the second evaporator 49.

(3) As the variable throttling mechanism 181, FIGS. 24 (a) and 24(b) show a concrete example in which: the movable plate member 181c has the first throttle hole 181a small in throttle opening, and the second throttle hole 181b larger in throttle opening than the first throttle hole 181a, which are formed in parallel therein; and the movable plate member 181c is driven by the electric actuator 181d. Alternatively, a valve operating mechanism in which the throttle opening can be continuously adjusted may used for the variable throttling mechanism 181.

(4) The description of the first embodiment and the like takes an example where the present invention is applied to an air conditioner and a refrigerator for a vehicle. However, the first evaporator 15 in which the refrigerant evaporating temperature is higher and the second evaporator 19 in which the refrigerant evaporating temperature is lower may be both used for cooling the interior of a refrigerator. That is, the present invention may be so constructed that: the cold room of a refrigerator is cooled with the first evaporator 15 in which the refrigerant evaporating temperature is higher; and the freezing room in the refrigerator is cooled with the second evaporator 19 in which the refrigerant evaporating temperature is lower.

(5) The description of the 14th embodiment (FIG. 15) and the like takes an example where one refrigeration unit 37 is constructed of the first evaporator 15 and the second evaporator 19, and the interior of one refrigerator is cooled with this refrigeration unit 37. However, the first evaporator 15 and the second evaporator 19 may be disposed in different refrigerators to cool the different refrigerators by using the first evaporator 15 and the second evaporator 19.

(6) The description of the 14th embodiment (FIG. 15) and the like takes an example where the vapor-liquid separator 35 is disposed on the outlet side of the first evaporator 15. A vapor-liquid separator (liquid receiver) may also be disposed on the outlet side of the radiator 13. In this case, in the normal operation, the flow rate of cycle refrigerant is so controlled that the refrigerant at the outlet of the first evaporator 15 has a predetermined degree of superheat. Thus, in the normal operation, the vapor-liquid separator 35 disposed on the outlet side of the radiator 13 is used as a passage for superheated gas refrigerant. Therefore, the vapor-liquid separator 35 functions to separate refrigerant into vapor and liquid and to store liquid phase refrigerant only in the defrosting operation.

(7) Though not specified in the above description of the embodiments, any kind of refrigerant can be used as long as it is applicable to a vapor compression refrigerant cycle. Such refrigerants include fluorocarbon refrigerants, HC alternatives for chlorofluorocarbon, and carbon dioxide ($CO_2$).

Chlorofluorocarbon cited here is the generic designation for organic compounds composed of carbon, fluorine, chlorine, and hydrogen, and is widely used as refrigerant. Fluorocarbon refrigerants include HCFC (hydrochlorofluorocarbon) refrigerant, HFC (hydrofluorocarbon) refrigerant, and the like. Since these refrigerants do not destroy the ozone layer, they are called alternatives for chlorofluorocarbon.

HC (hydrocarbon) refrigerants refer to refrigerant substances that contain hydrogen and carbon and occur in nature. HC refrigerants include R600a (isobutane), R290 (propane), and the like.

(8) All of the first to 12th embodiments described above are the examples of constructions in which a vapor-liquid separator is not used. However, a liquid receiver that separates refrigerant into vapor and liquid and lets only liquid refrigerant out to the downstream side may be disposed downstream of the radiator 13. The vapor-liquid separator 35 provided in the 13th and following embodiments may be disposed on the suction side of the compressor 12 in the first to 12th embodiments. In this case, the compressor 12 is caused to suck only vapor phase refrigerant.

(9) The above-described embodiments are so constructed that: a variable displacement compressor is used as the compressor 12; the displacement of this variable displacement compressor 12 is controlled by the ECU 21; and the refrigerant discharge capacity of the compressor 12 is thereby controlled. However, a fixed displacement compressor may be used as the compressor 12. In this case, the operation of the fixed displacement compressor 12 is on/off-controlled by using an electromagnetic clutch, and the ratio of on-operation to off-operation of the compressor 12 is thereby controlled, so that the refrigerant discharge capacity of the compressor 12 is controlled.

When a motor-driven compressor is used as the compressor 12, the refrigerant discharge capacity can be controlled by controlling the number of revolutions of the motor-driven compressor 12.

(10) In the above-described embodiments, a variable flow rate ejector may be used as the ejector 14. The variable flow rate ejector is so constructed as to detect the degree of superheat of refrigerant at the outlet of the first evaporator 15 or the like, and adjust the refrigerant passage sectional area of the nozzle 14a, that is, the flow rate of the ejector 14. Thus, the pressure of refrigerant jetted from the nozzle 14a (the flow rate of sucked vapor phase refrigerant) can be controlled.

(11) In the above-described embodiments, each evaporator is used as an interior heat exchanger that is a use-side heat exchanger. The constructions of the above-described embodiments are applicable to cycles in which each evaporator mentioned above is used as an exterior heat exchanger designated as non-use-side heat exchanger or heat source-side heat exchanger. For example, the constructions of the above-described embodiments are also applicable to cycles used as heat pumps. In such refrigerant cycles for heating, each evaporator is used as an exterior heat exchanger and a condenser is used as an interior heat exchanger. Further, in refrigerant cycles for supplying hot water, water is heated with a condenser.

The invention claimed is:

1. An ejector-type refrigerant cycle device, comprising:
   a compressor that sucks and compresses refrigerant;
   a radiator that radiates heat from the high-pressure refrigerant discharged from the compressor;
   an ejector having a nozzle portion that depressurizes and expands refrigerant on a downstream side of the radiator, and a refrigerant suction port through which refrigerant is sucked by the flow of refrigerant jetted at high speed from the nozzle portion;
   a first evaporator having a refrigerant outflow side connected to a suction side of the compressor and a refrigerant inflow side connected to a refrigerant outflow side of the ejector;
   a first branch passage that branches a flow of refrigerant upstream of the ejector and guides the branched flow of refrigerant to the refrigerant suction port;
   a first throttling means that is disposed in the first branch passage and depressurizes and expands refrigerant; and
   a second evaporator that is disposed in the first branch passage downstream of the first throttling means, wherein:
   a refrigerant evaporating pressure of the second evaporator is lower than a refrigerant evaporating pressure of the first evaporator; and
   the first throttling means is provided with a fully opening function, and fully opens the first branch passage when the second evaporator is defrosted.

2. The ejector-type refrigerant cycle device according to claim 1, further comprising:
   a third evaporator that evaporates refrigerant to have a cooling capability that is the same as that of the first evaporator.

3. The ejector-type refrigerant cycle device according to claim 2, further comprising:
   a second branch passage that branches the flow of refrigerant at a portion of the first branch passage positioned upstream of the first throttling means and joins the branched flow of refrigerant to the flow of refrigerant between the refrigerant outflow side of the first evaporator and the suction side of the compressor; and
   a second throttling means that is disposed in the second branch passage and depressurizes and expands refrigerant,
   wherein the third evaporator is disposed in the second branch passage downstream of the second throttling means.

4. The ejector-type refrigerant cycle device according to claim 1, further comprising
   a third throttling means that is provided between a refrigerant outflow side of the radiator and a refrigerant inflow side of the first evaporator,
   wherein the ejector is provided in parallel with the third throttling means.

5. The ejector-type refrigerant cycle device according to claim 1, further comprising:
   a shut mechanism that shuts a passage area located upstream of the ejector when the second evaporator is defrosted.

6. The ejector-type refrigerant cycle device according to claim 1, further comprising:
   a vapor-liquid separator that is provided on a refrigerant outflow side of the first evaporator, wherein the vapor-liquid separator separates refrigerant into vapor and liquid, and stores liquid phase refrigerant and lets vapor phase refrigerant out to a refrigerant suction side of the compressor.

7. The ejector-type refrigerant cycle device according to claim 1, wherein said first throttling means is movable between a first position which is fully opened and a second position which defines a fixed throttle.

8. The ejector-type refrigerant cycle device according to claim 7, wherein the throttling means is only movable between the first and second positions.

9. The ejector-type refrigerant cycle device according to claim 1, wherein the refrigerant outflow side of the evaporator is connected directly to the suction side of the compressor.

10. An ejector-type refrigerant cycle device, comprising:
a compressor that sucks and compresses refrigerant;
a radiator that radiates heat from the high-pressure refrigerant discharged from the compressor;
an ejector having a nozzle portion that depressurizes and expands refrigerant, the ejector being disposed directly downstream from the radiator, and a refrigerant suction port through which refrigerant is sucked by the flow of refrigerant jetted at high speed from the nozzle portion;
a first evaporator having a refrigerant outflow side directly connected to a suction side of the compressor;
a first branch passage that branches a flow of refrigerant upstream of the ejector and guides the branched flow of refrigerant to the refrigerant suction port;
a first throttling means that is disposed in the first branch passage and depressurizes and expands refrigerant; and
a second evaporator that is disposed in the first branch passage directly downstream of the first throttling means, wherein:
a refrigerant evaporating pressure of the second evaporator is lower than a refrigerant evaporating pressure of the first evaporator; and
the first throttling means is provided with a fully opening function, and fully opens the first branch passage when the second evaporator is defrosted.

11. The ejector-type refrigerant cycle device according to claim 10, further comprising:
a third evaporator that evaporates refrigerant to have a cooling capability that is the same as that of the first evaporator.

12. The ejector-type refrigerant cycle device according to claim 11, further comprising:
a second branch passage that branches the flow of refrigerant at a portion of the first branch passage positioned upstream of the first throttling means and joins the branched flow of refrigerant to the flow of refrigerant between the refrigerant outflow side of the first evaporator and the suction side of the compressor; and
a second throttling means that is disposed in the second branch passage and depressurizes and expands refrigerant,
wherein the third evaporator is disposed in the second branch passage downstream of the second throttling means.

13. The ejector-type refrigerant cycle device according to claim 10,
wherein the first evaporator is connected directly to a refrigerant outflow side of the ejector.

14. The ejector-type refrigerant cycle device according to claim 10, further comprising
a third throttling means that is provided between a refrigerant outflow side of the radiator and a refrigerant inflow side of the first evaporator, wherein the ejector is provided in parallel with the third throttling means.

15. The ejector-type refrigerant cycle device according to claim 10, further comprising:
a shut mechanism that shuts a passage area located upstream of the ejector when the second evaporator is defrosted.

16. The ejector-type refrigerant cycle device according to claim 10, further comprising:
a vapor-liquid separator that is provided on a refrigerant outflow side of the first evaporator,
wherein the vapor-liquid separator separates refrigerant into vapor and liquid, and stores liquid phase refrigerant and lets vapor phase refrigerant out to a refrigerant suction side of the compressor.

17. The ejector-type refrigerant cycle device according to claim 10, wherein said first throttling means is movable between a first position which is fully opened and a second position which defines a fixed throttle.

18. The ejector-type refrigerant cycle device according to claim 17, wherein the throttling means is only movable between the first and second positions.

19. An ejector-type refrigerant cycle device, comprising:
a compressor that sucks and compresses refrigerant;
a radiator that radiates heat from the high-pressure refrigerant discharged from the compressor;
an ejector having a nozzle portion that depressurizes and expands refrigerant on a downstream side of the radiator, and a refrigerant suction port through which refrigerant is sucked by the flow of refrigerant jetted at high speed from the nozzle portion;
a first evaporator having a refrigerant outflow side connected to a suction side of the compressor;
a first branch passage that branches a flow of refrigerant upstream of the ejector and guides the branched flow of refrigerant to the refrigerant suction port;
a first throttling means that is disposed in the first branch passage and depressurizes and expands refrigerant, the first throttling means being movable between a first position which is fully opened and a second position which defines a fixed throttle; and
a second evaporator that is disposed in the first branch passage downstream of the first throttling means, wherein:
a refrigerant evaporating pressure of the second evaporator is lower than a refrigerant evaporating pressure of the first evaporator; and
the first throttling means is provided with a fully opening function, and fully opens the first branch passage when the second evaporator is defrosted.

20. The ejector-type refrigerant cycle device according to claim 19, further comprising:
a third evaporator that evaporates refrigerant to have a cooling capability that is the same as that of the first evaporator.

21. The ejector-type refrigerant cycle device according to claim 20, further comprising:
a second branch passage that branches the flow of refrigerant at a portion of the first branch passage positioned upstream of the first throttling means and joins the branched flow of refrigerant to the flow of refrigerant between the refrigerant outflow side of the first evaporator and the suction side of the compressor; and
a second throttling means that is disposed in the second branch passage and depressurizes and expands refrigerant, wherein the third evaporator is disposed in the second branch passage downstream of the second throttling means.

22. The ejector-type refrigerant cycle device according to claim 19,
wherein the first evaporator is connected directly to a refrigerant outflow side of the ejector.

23. The ejector-type refrigerant cycle device according to claim 19, further comprising
a third throttling means that is provided between a refrigerant outflow side of the radiator and a refrigerant inflow side of the first evaporator,
wherein the ejector is provided in parallel with the third throttling means.

24. The ejector-type refrigerant cycle device according to claim 19, further comprising:
a shut mechanism that shuts a passage area located upstream of the ejector when the second evaporator is defrosted.

25. The ejector-type refrigerant cycle device according to claim 19, further comprising:
a vapor-liquid separator that is provided on a refrigerant outflow side of the first evaporator,
wherein the vapor-liquid separator separates refrigerant into vapor and liquid, and stores liquid phase refrigerant and lets vapor phase refrigerant out to a refrigerant suction side of the compressor.

26. The ejector-type refrigerant cycle device according to claim 19, wherein the throttling means is only movable between the first and second positions.

27. An ejector-type refrigerant cycle device, comprising:
a compressor that sucks and compresses refrigerant;
a radiator that radiates heat from the high-pressure refrigerant discharged from the compressor;
an ejector having a nozzle portion that depressurizes and expands refrigerant on a downstream side of the radiator, and a refrigerant suction port through which refrigerant is sucked by the flow of refrigerant jetted at high speed from the nozzle portion;
a first evaporator having a refrigerant outflow side connected directly to a suction side of the compressor;
a first branch passage that branches a flow of refrigerant upstream of the ejector and guides the branched flow of refrigerant to the refrigerant suction port;
a first throttling means that is disposed in the first branch passage and depressurizes and expands refrigerant; and
a second evaporator that is disposed in the first branch passage downstream of the first throttling means, wherein:
a refrigerant evaporating pressure of the second evaporator is lower than a refrigerant evaporating pressure of the first evaporator; and
the first throttling means is provided with a fully opening function, and fully opens the first branch passage when the second evaporator is defrosted.

28. The ejector-type refrigerant cycle device according to claim 27, further comprising:
a third evaporator that evaporates refrigerant to have a cooling capability that is the same as that of the first evaporator.

29. The ejector-type refrigerant cycle device according to claim 28, further comprising:
a second branch passage that branches the flow of refrigerant at a portion of the first branch passage positioned upstream of the first throttling means and joins the branched flow of refrigerant to the flow of refrigerant between the refrigerant outflow side of the first evaporator and the suction side of the compressor; and
a second throttling means that is disposed in the second branch passage and depressurizes and expands refrigerant,
wherein the third evaporator is disposed in the second branch passage downstream of the second throttling means.

30. The ejector-type refrigerant cycle device according to claim 27,
wherein the first evaporator is connected directly to a refrigerant outflow side of the ejector.

31. The ejector-type refrigerant cycle device according to claim 27, further comprising
a third throttling means that is provided between a refrigerant outflow side of the radiator and a refrigerant inflow side of the first evaporator,
wherein the ejector is provided in parallel with the third throttling means.

32. The ejector-type refrigerant cycle device according to claim 27, further comprising:
a shut mechanism that shuts a passage area located upstream of the ejector when the second evaporator is defrosted.

33. The ejector-type refrigerant cycle device according to claim 27, wherein said first throttling means is movable between a first position which is fully opened and a second position which defines a fixed throttle.

34. The ejector-type refrigerant cycle device according to claim 33, wherein the throttling means is only movable between the first and second positions.

* * * * *